(12) United States Patent
Sen et al.

(10) Patent No.: US 9,659,046 B2
(45) Date of Patent: May 23, 2017

(54) PROBING A HASH TABLE USING VECTORIZED INSTRUCTIONS

(71) Applicant: Oracle International Corporation, Redwood Shores, CA (US)

(72) Inventors: Rajkumar Sen, Foster City, CA (US); Sabina Petride, Hayward, CA (US); Nipun Agarwal, Saratoga, CA (US)

(73) Assignee: Oracle Inernational Corporation, Redwood Shores, CA (US)

( * ) Notice: Subject to any disclaimer, the term of this patent is extended or adjusted under 35 U.S.C. 154(b) by 343 days.

(21) Appl. No.: 13/956,350

(22) Filed: Jul. 31, 2013

(65) Prior Publication Data

US 2015/0039627 A1 Feb. 5, 2015

(51) Int. Cl.
*G06F 17/30* (2006.01)

(52) U.S. Cl.
CPC .................................. *G06F 17/3033* (2013.01)

(58) Field of Classification Search
CPC .................................................. G06F 17/3033
USPC .......................................................... 707/747
See application file for complete search history.

(56) References Cited

U.S. PATENT DOCUMENTS

| | | | |
|---|---|---|---|
| 5,892,960 A | 4/1999 | Seide | |
| 7,926,009 B2 | 4/2011 | Mejdrich et al. | |
| 8,688,957 B2 | 4/2014 | Smelyanskiy et al. | |
| 9,047,077 B2 | 6/2015 | Schmidt | |
| 2004/0006667 A1 | 1/2004 | Bik | |
| 2006/0117036 A1* | 6/2006 | Cruanes ............ | G06F 17/30498 |
| 2007/0234005 A1* | 10/2007 | Erlingsson ........ | G06F 17/30949 711/216 |
| 2007/0245119 A1 | 10/2007 | Hoppe | |
| 2007/0294506 A1* | 12/2007 | Ross ................... | G06F 12/0897 711/216 |
| 2008/0077768 A1* | 3/2008 | Inoue .................. | G06F 9/30021 712/9 |
| 2011/0047359 A1* | 2/2011 | Eichenberger .......... | G06F 8/451 712/222 |
| 2011/0078415 A1 | 3/2011 | Johnson et al. | |
| 2011/0202744 A1 | 8/2011 | Kulkarni et al. | |
| 2011/0213766 A1 | 9/2011 | Hong et al. | |
| 2012/0143877 A1 | 6/2012 | Kumar et al. | |
| 2013/0013585 A1 | 1/2013 | Graefe | |
| 2013/0046767 A1 | 2/2013 | Lee et al. | |
| 2013/0346424 A1 | 12/2013 | Zhang et al. | |
| 2014/0006756 A1 | 1/2014 | Ermolaev | |
| 2014/0188906 A1 | 7/2014 | Muller et al. | |

OTHER PUBLICATIONS

Ross, K., "Efficient Hash Probes on Modern Processors" IBM 2007 (5 pages).

(Continued)

*Primary Examiner* — Mahesh Dwivedi
*Assistant Examiner* — Johnese Johnson
(74) *Attorney, Agent, or Firm* — Hickman Palermo Becker Bingham LLP; Daniel D. Ledesma

(57) ABSTRACT

Techniques for performing database operations using vectorized instructions are provided. In one technique, a hash table probe phase involves executing vectorized instructions to determine where in a bucket a particular key is located. This determination may be preceded by one or more vectorized instructions that are used to determine whether the bucket contains the particular key.

20 Claims, 24 Drawing Sheets

(56) References Cited

OTHER PUBLICATIONS

U.S. Appl. No. 13/956,357, filed Aug. 1, 2013, Office Action, Nov. 10, 2015.
U.S. Appl. No. 13/956,354, filed Aug. 1, 2013, Notice of Allowance, Oct. 28, 2015.
U.S. Appl. No. 13/956,354, filed Aug. 1, 2013, Final Office Action, Sep. 25, 2015.
U.S. Appl. No. 13/956,343, filed Jul. 31, 2013, Notice of Allowance, Oct. 5, 2015.
Willhalm et al., "SIMD-Scan: Ultra Fast in-Memory Table Scan Using on-Chip Vector Processing Units", dated Aug. 24, 2009, ACM, 10 pages.
Sompolski et al., Vectotization vs. Compilation in Query Execution, dated Jun. 13, 2011, ACM 8 pages.
Martin, Rich, "A Vectorized Hash-Join", dated May 11, 1996, 17 pages.
Kanada, Yasusi, A Vectorization Technique of Hashing and its Application to Several Sorting Algorithms, dated 1990, IEEE, 5 pages.
Franchetti et al., "Generating SIMD Vectorized Permutations", dated 2008, pp. 116-131.
U.S. Appl. No. 13/956,357, filed Aug. 1, 2013, Final Office Action, Mar. 3, 2016.
U.S. Appl. No. 13/956,354, filed Aug. 1, 2013, Office Action, Jul. 21, 2015.
U.S. Appl. No. 13/956,343, filed Jul. 31, 2013, Office Action, Jul. 17, 2015.
U.S. Appl. No. 13/956,357, filed Aug. 1, 2013, Notice of Allowance, Jun. 13, 2016.
U.S. Appl. No. 13/956,356, filed Aug. 1, 2013, Office Action, Jul. 28, 2016.
U.S. Appl. No. 13/956,356, Filed Aug. 1, 2013, Final Office Action mailed Dec. 12, 2016.

* cited by examiner

| Bucket 0 | Key01 | Key02 | Key03 | Key04 | Value01 | Value02 | Value03 | Value04 |
|---|---|---|---|---|---|---|---|---|
| ... | | | | | | | | |
| Bucket N | KeyN1 | KeyN2 | KeyN3 | KeynN4 | ValueN1 | ValueN2 | ValueN3 | ValueN4 |

HASH TABLE 100

*FIG. 1*

PROBING A HASH TABLE USING VECTORIZED INSTRUCTIONS

RELATED CASES

This case is related to U.S. application Ser. No. 13/956,343 filed Jul. 31, 2013 and is incorporated herein by reference as if fully disclosed herein. This case is also related to U.S. application Ser. No. 13/956,354 filed Aug. 1, 2013; Ser. No. 13/956,356 filed Aug. 1, 2013; and Ser. No. 13/956,357 filed Aug. 1, 2013.

FIELD OF THE INVENTION

Embodiments relate to executing database operations and, more specifically, to executing database operations, such as join and aggregation, using vectorized or SIMD instructions.

BACKGROUND

Much progress has been made to improve the efficiency of executing database operations. Common database operations include join operations and aggregate operations. Such operations happen to be some of the most complex database operations that are supported by commercial database management systems. Thus, the performance of a database management system depends, to a large extent, on the performance of the execution of these two operations. There is an almost constant desire to improve the performance of join and aggregate operations by introducing new algorithms and optimizations.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 1 is a block diagram that depicts an example hash table, in an embodiment;

DETAILED DESCRIPTION

Figure 2A:
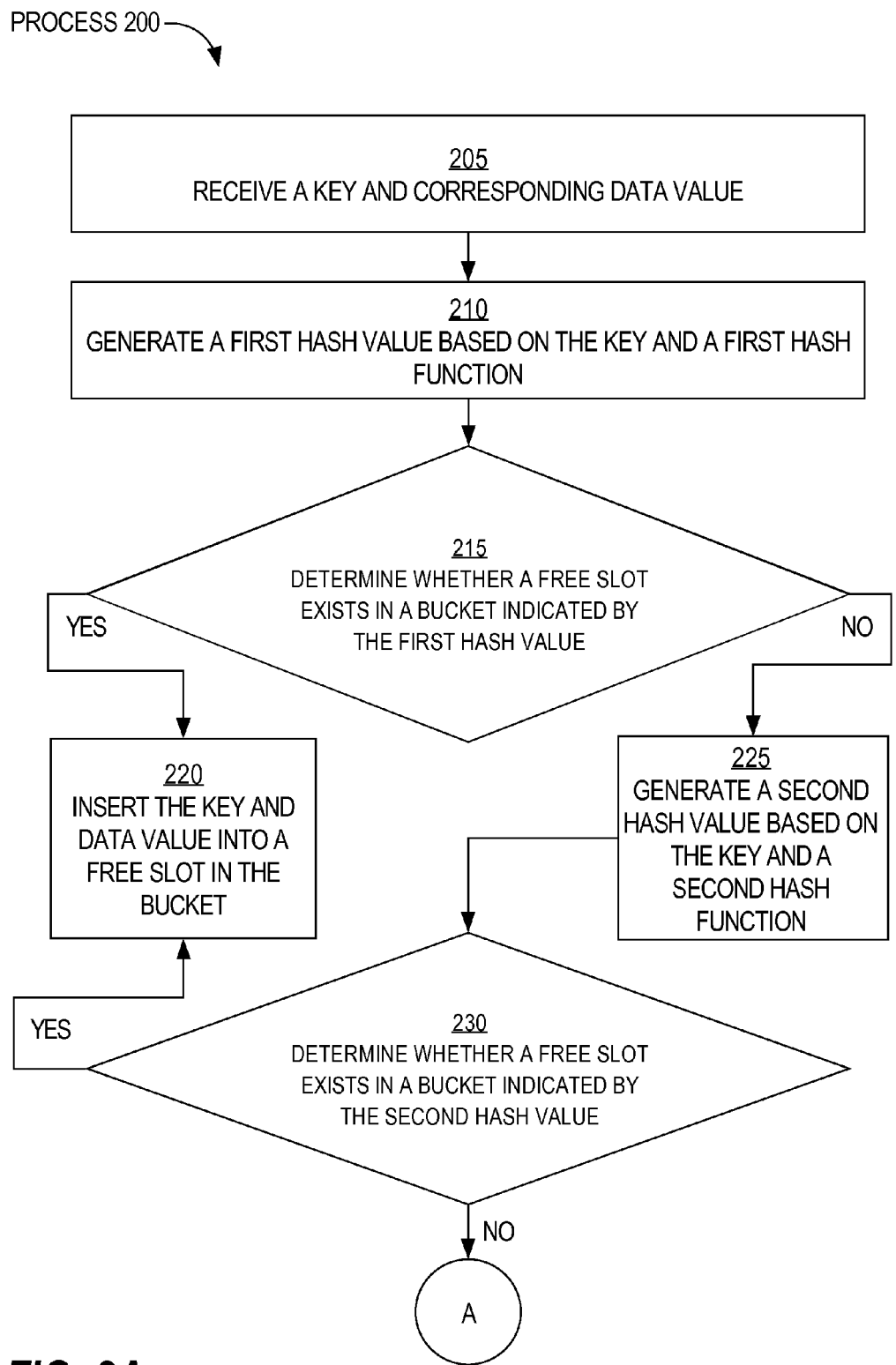
FIGS. 2A-2B is a flow diagram that depicts a process for generating a hash table, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Hash Join and Hash Aggregation

In some commercial database systems, a common join method and aggregation method are, respectively, hash join and hash aggregation. One hash table join technique proceeds as follows.

First, one of two relations (e.g., tables) is categorized as the "build" relation (which is typically the smaller relation) and the other relation as the "probe" relation. Then, a hash table is built or generated based on the build relation. The hash table consists of a join key/attribute and a payload (e.g., ROWID). Once the hash table is built, the probe relation is scanned and, for each row of the probe relation, a lookup of the hash table is done to find the matching rows from the build relation. The phase where the hash table is built is referred to as the "build phase" of the algorithm, while the phase to find the matching row(s) is referred to as the "probe phase."

The probe phase has two variants. In the first variant, there are no duplicates in the build relation (which means that the join key is a primary key) and, therefore, a probe using a single row from the probe relation would result in finding only one matching row in the build relation. In the second variant, the build relation might have duplicates and, thus, a probe using a single row from the probe relation might result in finding multiple matching rows in the build relation. Hence, it is extremely important that these phases of the hash join algorithm are executed in the most efficient manner possible.

One hash table aggregation technique proceeds as follows. A hash table is used to store the grouping keys and the payload (aggregate values). For each input row of the input relation, a hash value is calculated and a hash table entry is checked to determine whether the input row belongs to an existing group. If there is match, then the payload is updated to account for the input row. If not, then a new group (grouping keys and payload) entry is created and inserted into the hash table.

It is important that hash table build, probe, and aggregate operations are executed efficiently in order to provide an overall good performance for join operations and aggregation operations.

General Overview

Techniques are provided for performing multiple database operations using vectorized instructions. Such instructions are also referred to as SIMD (single instruction, multiple data) instructions. The database operations include generating a hash table, probing a hash table (that may or may not include duplicate keys), aggregation, and data compaction.

The vectorized instructions that are used may be different depending on the type of operation that is "vectorized." For example, in a hash table build, one or more vectorized instructions are used to determine whether a bucket in a hash table includes a free slot for inserting a key. As another example, in hash table probe, one or more vectorized instructions are used to determine a position, within a bucket of a hash table, where a key is located. As another example, in data compaction, In another technique, one or more vectorized instructions are used to identify a shuffle mask based on matching bits and update an output array based on the shuffle mask and an input array.

Techniques are also provided for determining whether to perform an operation using a vectorized approach (that involves one or more vectorized instructions) or a non-vectorized approach (that does not involve any vectorized instructions). Such a determination may involve analyzing certain heuristics and/or estimating a cost of performing the operation using a vectorized approach versus a non-vectorized approach.

SIMD Instructions

A SIMD instruction is an instruction that, when processed, causes a SIMD operation to be performed on multiple distinct data values instead of a single data value. A SIMD operation is implemented in hardware and may take one or more machine cycles to execute. One approach for implementing a SIMD operation is to use one or more registers that are each capable of storing multiple distinct data values. Such registers are referred to herein as SIMD registers. For example, if a SIMD register is capable of storing 128 bits and data elements (e.g., integers) are 32 bits in size, then the SIMD register is capable of storing 128/32=4 distinct data elements.

In contrast, if a register is only capable of storing one data value or if only one data value can be operated on at a time, then potentially four times as many hardware instructions would need to be performed relative to a computer system that includes SIMD registers.

A computer system that implements supports both SIMD and non-SIMD instructions may include multiple SIMD registers and multiple non-SIMD registers. The SIMD registers may be on a different hardware element (e.g., coprocessor) than the hardware element on which the non-SIMD registers reside.

Packed Bucket Hash Table

Database operations, such as hash table join and hash table aggregation, involve a hash table. In an embodiment, the hash table is implemented as a packed bucket data structure where each bucket has a fixed length and can store multiple keys and corresponding data values. The size of a hash bucket may be equivalent to a cache line size. A cache line refers to a fixed size of blocks of data that is transferred between memory and cache. Alternatively, the size of a hash bucket may be determined based on the size of a SIMD register, which may or may not be the same as the cache line size. For example, if a SIMD register is 128 bits, then 128 bits (or a multiple thereof) may be chosen as the hash bucket size.

FIG. 1 is a block diagram that depicts an example hash table 100, in an embodiment. Hash table 100 comprises N+1 buckets, each bucket capable of storing four keys and four corresponding data values. Each bucket in hash table 100 is said to have four slots, each slot of equal size, such as 2 bytes, 4 bytes, or 8 bytes. In an embodiment, the number of slots is determined based on the number of data elements (e.g., keys or data values) that can fit into a SIMD register. Thus, in this example, hash table 100 includes four slots based on the fact that a SIMD register that will store sets of keys or corresponding data values has the capacity to store four data elements.

Cuckoo Hashing

Figure 2B:
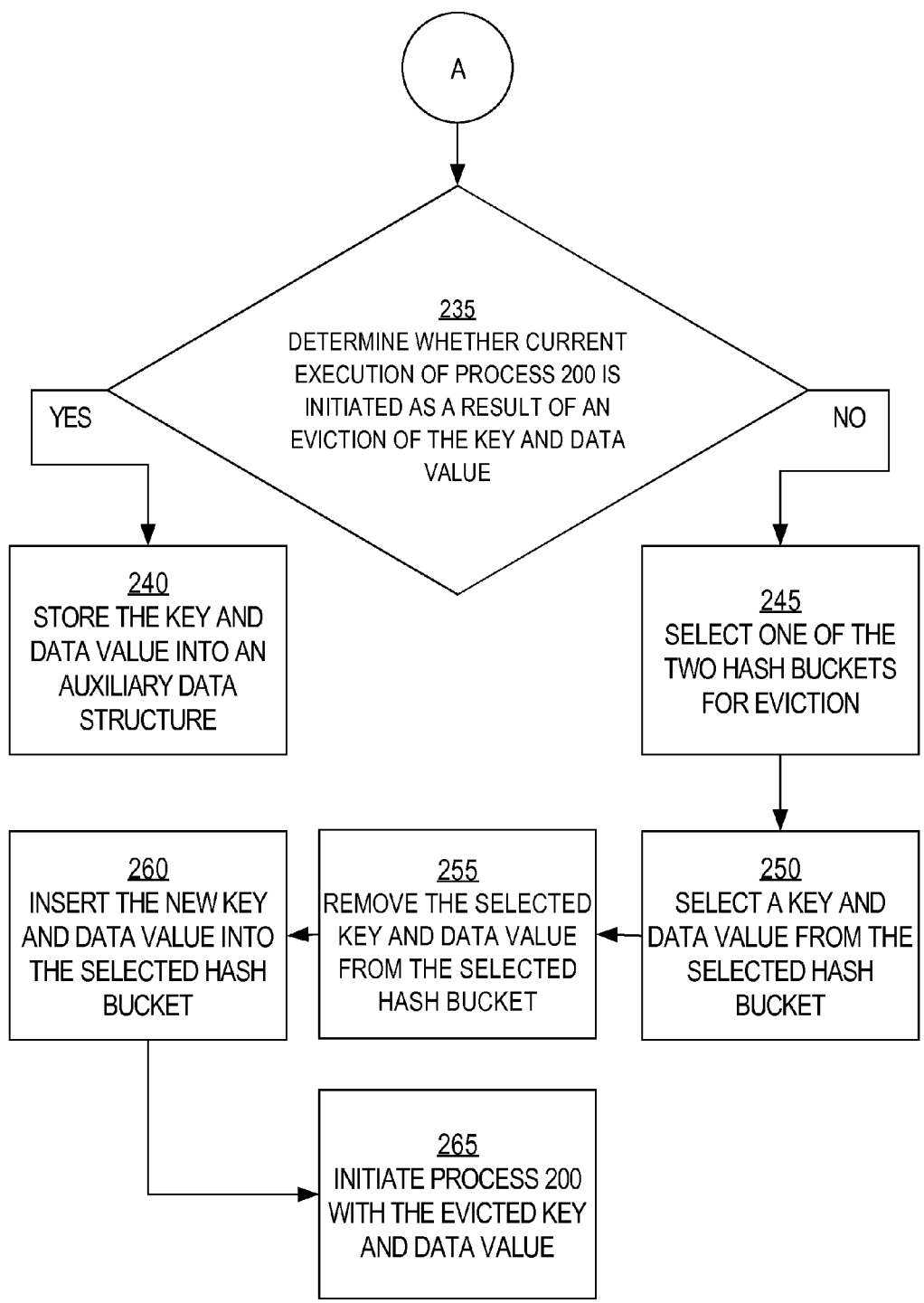

FIG. 2A-2B is a flow diagram that depicts a process 200 for generating a hash table, in an embodiment. Process 200 is a variation of "cuckoo hashing," which is a technique for resolving hash collisions in a bucket of a hash table. According to cuckoo hashing, there are two possible locations in a hash table for each key. If two hash buckets associated with a new key are full, then an older key from one of the two buckets is moved to a different location in the hash table and the new key is inserted into that bucket.

At block 205, a key and a data value are received. An example of a key is an employee identifier (which may be unique) or an employee name (which is not necessarily unique). An example of a data value is a row identifier that indicates where the key is located in a build relation/table. The key and data value may be received in response to a function call to insert the key and data value into a hash table. In an embodiment, in addition to the key and data value parameters, the function also has an "evict" parameter (e.g., "Boolean evictbucket") that indicates whether the function is called in response to an eviction, from a hash bucket, of the key and the data value. Initially, the evict parameter is zero, false, NULL, or otherwise indicates that the function has not been called in response to an eviction.

At block 210, a first hash value is generated based on a first hash function and the key received in block 205. The first hash value corresponds to a first hash bucket in the hash table.

At block 215, it is determined whether there is a "free" slot in the first hash bucket for inserting the key and data value. If a free slot in the first hash bucket is identified, then process 200 proceeds to block 220. Otherwise, process 200 proceeds to block 225.

At block 220, the key and data value are inserted into the slot of the first hash bucket.

At block 225, a second hash value is generated based on a second hash function and the key received in block 205. The second hash function is different than the hash function used in block 210. The second hash value corresponds to a second hash bucket that is different than the first hash bucket.

At block 230, it is determined whether there is a "free" slot in the second hash bucket for inserting the key and data value. If a free slot in the second hash bucket is identified, then process 200 proceeds to block 220. Otherwise, process 200 proceeds to block 235. If process 200 proceeds to block 235, then that indicates that two buckets have been selected and both have been determined to be full.

At block 235, it is determined whether the current execution of process 200 was initiated as a result of an eviction of the key and data value received in block 205. This may be determined with the evict parameter (e.g., "Boolean evictbucket") described previously. If so, then process 200 proceeds to block 240. Otherwise, process 200 proceeds to block 245.

At block 240, the key and data value received in block 205 is stored in an auxiliary data structure. In an embodiment, the auxiliary data structure is a second hash table that has the same structure as the hash table involved in blocks 205-235. Blocks 235-240 ensure that one eviction does not immediately follow another eviction. If blocks 235-240 are not performed, then a significant amount of processing may be performed evicting a key-data value pair in order to insert another key-data value pair, evicting another key-data value to insert the previously-evicted key-data value pair, and so on.

At block 245, one of the two hash buckets are selected for evicting one of the key-data value pairs. This selection may be performed in any manner, such as calculating a value based on the current clock time mod 2 or some other random or semi-random calculation. A '0' indicates that the first hash bucket should be used while a '1' indicates that the second hash bucket should be used.

At block 250, a key and a data value are selected for evicting from the selected hash bucket. The selected keydata value pair may always be the same slot in a hash bucket (e.g., the first slot or the last slot).

The key and data value may be assigned to variables (e.g., "evictkey" and "evictvalue") for later use when process 200 is initiated again. Block 250 may also comprise setting the evict parameter described previously to be a Boolean true or some other value that indicates that an eviction has occurred and the corresponding key and data value needs to be inserted into another location in the hash table. The setting of the evict parameter (in combination with blocks 235-240) ensures that at most one eviction for each key-data value pair that is being inserted into the hash table. The setting of the evict parameter may occur in block 245 or after block 250.

At block 255, the selected key and data value are removed from the bucket. Removing the selected key and data value may involve shifting the data elements in the hash bucket to remove the selected key-data value pair from the hash bucket and free up a slot for the new key and data value. For example, if the selected slot for eviction is the $0^{th}$ slot, then the data elements in the selected hash bucket are left shifted.

At block 260, the new key and data value are inserted into the available slot in the selected hash bucket. For example, if the data elements in the $0^{th}$ slot were evicted and the contents of the hash bucket were left shifted, then the new key and data value are inserted into the $3^{rd}$ slot in the selected hash bucket.

If the same (e.g., $0^{th}$) slot is always evicted when an eviction occurs, the remaining key-data value pairs in the bucket are shifted, and the key-data value pair to insert is always inserted in the open (e.g., $3^{rd}$) slot as a result of the shifting, then this assures that the "oldest" key-value pair in a bucket is always evicted. Such an approach one approach for load balancing among key-value pairs in a bucket. Alternatively, load balancing information may be stored in the bucket itself. However, storing and processing such load balancing information represents additional overhead that may be unnecessary relative to always selecting the key-data value pair in the same slot for eviction.

At block 265, process 200 is initiated again, except with the evicted key and evicted data value. Block 265 may comprise calling a hash insert function again with the evicted key (e.g., "evictkey"), the evicted data value (e.g., "evictvalue"), and a parameter (e.g., "evictbucket") that indicates that an eviction has occurred.

Process 200 may be modified to include more than two hash functions, indicating that a key may hash to three or more hash buckets in a hash table. Alternatively, process 200 may be modified to include only one hash function for the hash table. Thus, if a hash bucket is full, then one or more other data structures may be used to store a key that hashes to the hash bucket and, thus, those other data structures would be searched in process 200.

Hash Table Build Using SIMD Instructions

Figure 3A:
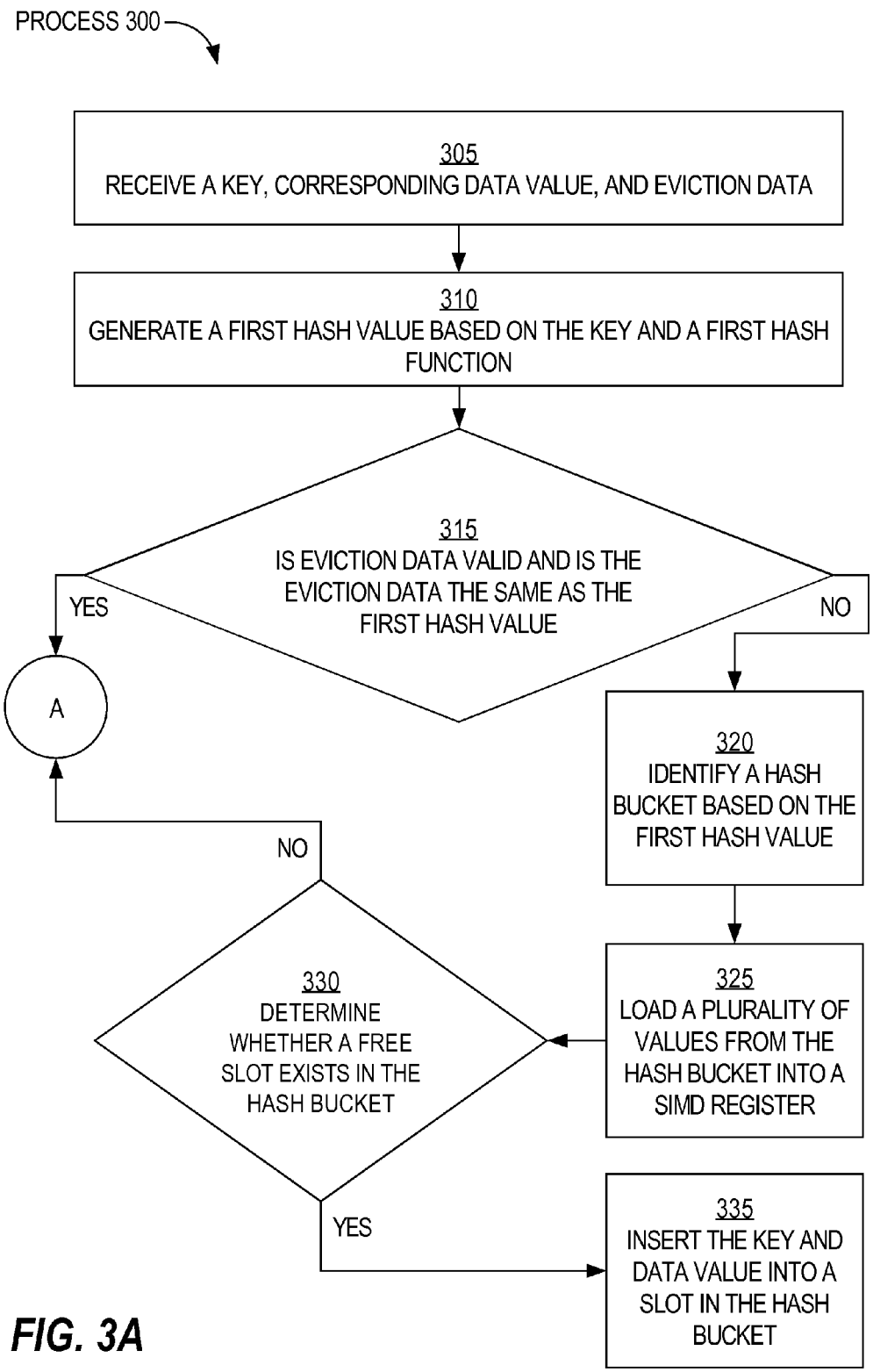
FIGS. 3A-3B is a flow diagram that depicts a process for generating a hash table using SIMD instructions, in an embodiment.
Figure 3B:
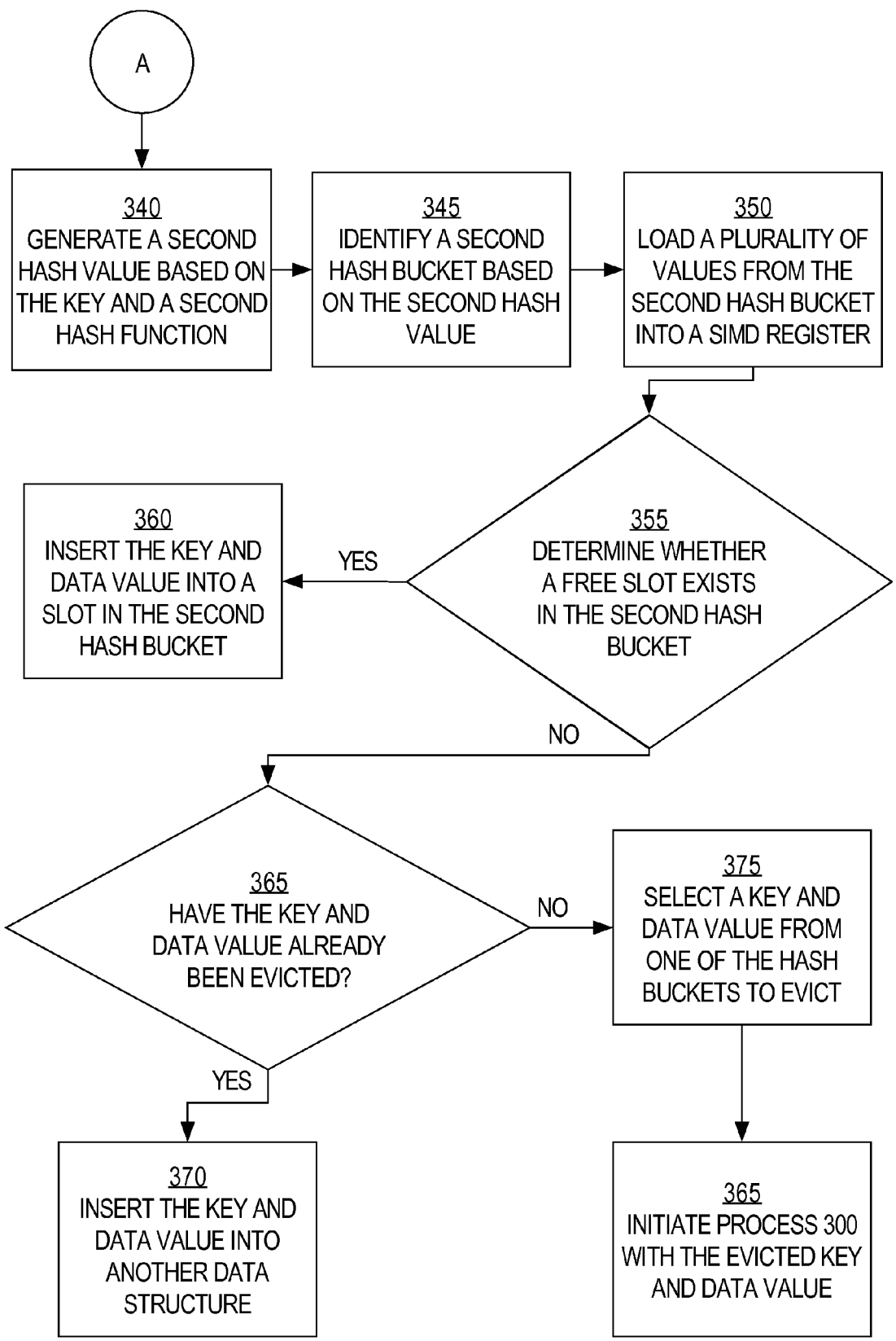

FIGS. 3A-3B is a flow diagram that depicts a process 300 for generating a hash table using SIMD instructions, in an embodiment. Process 300 may be initiated in response to each key and data value that is read from an input relation or table.

At block 305, a key and a corresponding data value into a hash table. The key and the data value may be received in response to a function call that includes the key and the data value as input parameters. In an embodiment, block 305 also involves receiving eviction data that indicates whether the function has been called in response to the eviction of the key and the data value from a hash bucket. The eviction data may further indicate a particular bucket in the hash table.

At block 310, a first hash value is generated based on a first hash function and the received key.

At block 315, it is determined whether the eviction data is valid (e.g., >=0) and whether the first hash value is the same as the eviction data. If so, the process 300 proceeds to block 340. Otherwise, process 300 proceeds to block 320.

At block 320, the first hash value is used to identify a bucket in the hash table that includes one or more data values that correspond to one or more keys. The size of the bucket is large enough to include multiple data elements (whether keys or data values that correspond to keys). In some cases, the bucket may not include any data elements. In other cases, the bucket may be full, in that no additional data elements may fit into the bucket.

Figure 4A:
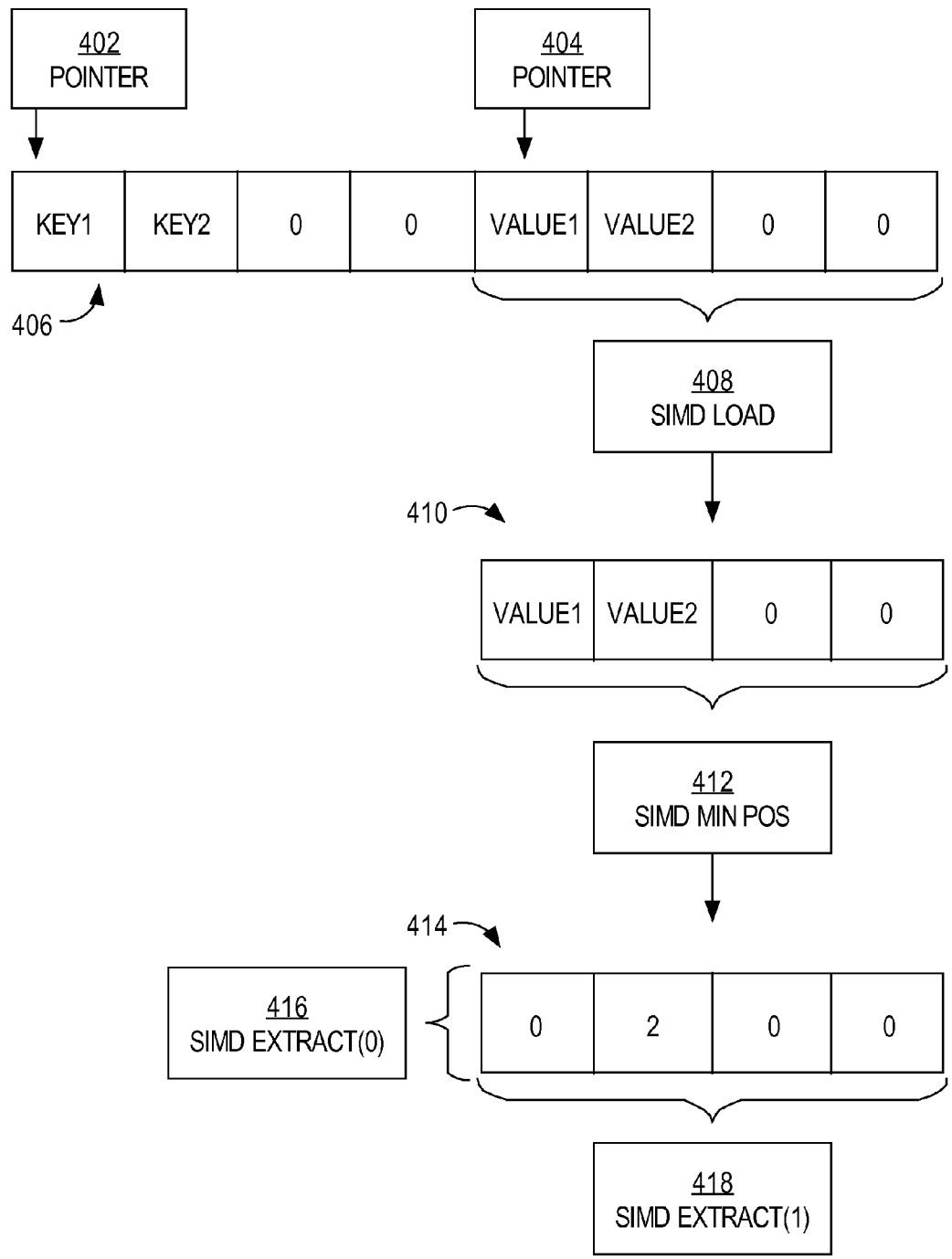
FIG. 4A is a block diagram that depicts a flow of data in SIMD registers and operations that are performed on the contents of the SIMD registers, in an embodiment.

FIG. 4A is a block diagram that depicts a flow of data in SIMD registers and operations that are performed on the contents of the SIMD registers, in an embodiment. Pointer 402 is entitled "htentry" and points to a bucket 406 in a hash table, such as hash table 100. The value of pointer 402 is based on the first hash value, generated in block 310. Pointer 404 is entitled "htentryid" and points to a position within bucket 406 pointed to by pointer 402. Pointer 404 may be calculated by adding N bytes to pointer 402, where N is the size of the number of keys that may fit in the bucket. For example, if each key is 4 bytes and four keys are capable of fitting into a bucket, then N=16.

At block 325, one or more data elements in the bucket are loaded into a (SIMD) register that has the capacity to store a certain number of data elements. For example, if each data element is four bytes (or 32 bits) and the register can store 128 bits, then the register can store four (128/32) data elements. The loading of a number of data elements from the hash table is performed by executing a SIMD load instruction. Example SIMD code is "m2=_mm_load_si128 ((_m128i*)htentryrid);", where "m2" refers to a SIMD register, "_mm_load_si128" is the name of a SIMD load instruction, and "htentryrid" points to the location of a data value bucket that is identified based on the first hash value generated in block 310.

In one embodiment, the data element(s) that are loaded into a SIMD register from a hash bucket are key(s). In another example, the data element(s) that are loaded in to the SIMD register are data value(s) that correspond to the key(s). The choice of which type of data element (whether keys or data values that correspond to the keys) to load into a SIMD register may depend on what value in a bucket is used to indicate that the slot in which the value is located is free, empty, or available. For example, in some implementations, a valid key cannot be zero. Thus, a zero value in a key slot of a hash bucket indicates that the slot is free. In other implementations, a valid data value cannot be zero. Thus, a zero value in a data value slot of a hash bucket indicates that the slot is free. Even the following description includes an example where the data value portion of a bucket is used to identify an empty or available slot, other embodiments may use the key portion of a bucket to identify an empty or available slot.

In FIG. 4A, operation 408 is a SIMD operation that is performed in response to executing a SIMD load instruction. Operation 408 causes the data value portion of bucket 406 to be loaded into SIMD register 410.

At block 330, it is determined whether a slot in the bucket is free, empty, or otherwise available for the key and data value. If the bucket contains an available slot, then process 300 proceeds to block 335. Otherwise, process 300 proceeds to block 340. In an embodiment, block 330 involves identifying a slot that contains a zero ('0'). Alternatively, a zero may be a valid value, in which case a different value is used to indicate that a slot is free.

In the case where a zero value indicates an empty slot in the bucket, block 330 involves determining a position in the SIMD register that has the smallest value. Block 330 may be performed by executing another SIMD instruction. Example SIMD code that determines the position is "m2=_mm_minpos_epu32(m2)", wherein "m2" refers to a SIMD register and "_mm_minpos_epu32" is the name of a SIMD minimum position instruction, which indicates that the instruction operates on a 32-bit (or 4-byte) boundary.

In FIG. 4A, operation 412 is a SIMD operation that is performed in response to executing a SIMD instruction. Operation 412 causes the minimum value in SIMD register 410 to be determined. Additionally, operation 412 may cause the position, within SIMD register 410, of the minimum value to be determined. Output of operation 412 is stored in SIMD register 414, which may be the same register as SIMD register 410. The output of operation 412 may comprise the minimum value at the first position in SIMD register 414 and an indication of the position of the minimum value at the second position in SIMD register 414. (The exact positions within SIMD register 414 are not important as long as the type of data at each of those positions is consistent.)

If the SIMD minimum position instruction is based on a byte boundary (e.g., 2 bytes) that is smaller than the byte boundaries of the data elements (e.g., 4 bytes) that are stored in the register, then one or more additional SIMD instructions need to be executed. If such a SIMD minimum position instruction is applied, without performing one or more additional SIMD instructions, then a zero might be found when that zero pertains to one or more higher order bytes that act like "padding" to a data element. Thus, one or two bytes of the data value may always be zero. Also, in some cases, a data value (e.g., a row identifier) is limited to containing data that only needs a certain number of bytes (e.g., 1 or 2 bytes) while a large number of bytes allocated for that data value (e.g., 4 bytes) in a slot of a hash bucket.

There are at least two techniques to follow in order to handle the situation where the SIMD minimum position instruction is based on a byte boundary that is less than the byte boundary of data elements in a SIMD register. In one technique, a second SIMD register is loaded to include a shuffling of the contents of the first SIMD register. For example, if a 4-byte value in the first register comprises a, b, c, and d, then a corresponding 4-byte data element in the second register comprises c, d, a, and b. Such a loading may comprise using a mask register that includes the following values: {2,3,0,1,6,7,4,5,10,11,8,9,14,15,12,13}, where each value indicates a different 1-byte position in a SIMD register. Example SIMD code is "m3=_mm_shuffle_epi8(m2, mask)", wherein "m3" is the second SIMD register that will contain shuffled contents of the first SIMD register, "m2" is the first SIMD register that contains the data value(s) loaded from a bucket of the hash table, "_mm_shuffle_epi8" is the name of a SIMD shuffle instruction (that operates on 1-byte boundaries), and "mask" is the mask register.

The first and second SIMD registers are then added together. An example of a SIMD add instruction is "m2=_mm_add_epi16(m2,m3);", wherein "m2" is the first SIMD register that contains the data value(s), "_mm_add_epi16" is the add instruction, and "m3" is the second SIMD register that contains the shuffled contents. Then, a SIMD minimum position instruction is performed on the result of the addition. An example of such a SIMD minimum position instruction is "m2=_mm_minpos_epu16(m2)."

Figure 4B:
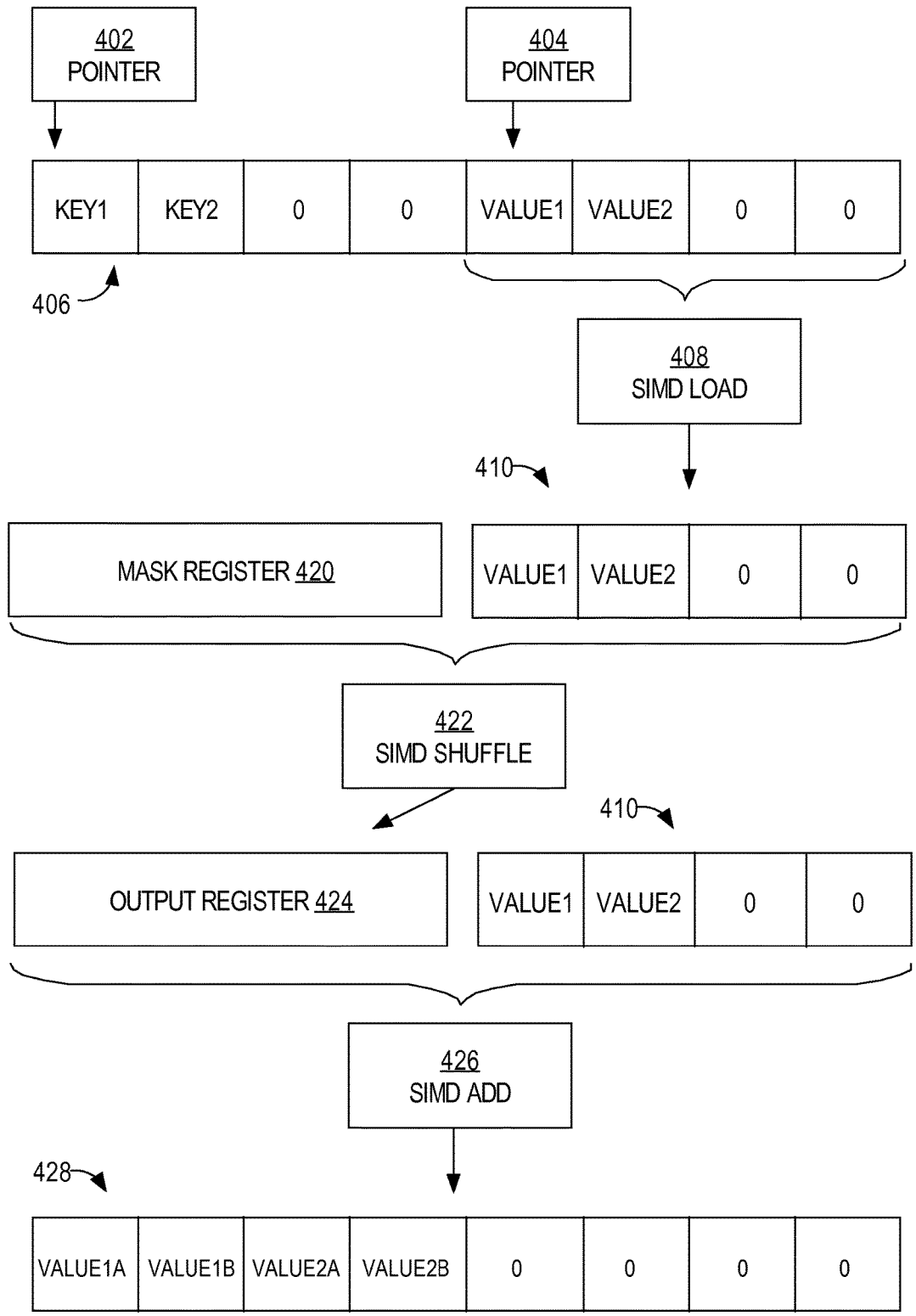
FIG. 4B is a block diagram that depicts one technique for identifying a minimum value in a SIMD register, in an embodiment.

FIG. 4B is a block diagram that depicts this first technique, in an embodiment. In FIG. 4B, SIMD mask register 420 includes a mask, such as {2,3,0,1,6,7,4,5,10,11,8,9,14,15,12,13} described above. The mask may be stored in SIMD mask register 420 throughout the process of generating the hash table or may be loaded on demand. Operation 422 is a SIMD shuffle operation that takes, as input, the contents of SIMD register 410 and SIMD mask register 420. The output of operation 422 is stored in SIMD register 424. Operation 426 is an SIMD add operation that takes, as input, the contents of SIMD register 410 and SIMD register 424. The output of operation 426 may be stored in a SIMD register 428 (which may be the same as SIMD register 410), the contents of which operation 412 takes as input. In this second technique, operation 412 (a SIMD MIN POS operation) operates on a different byte boundary (e.g., 2 bytes) than the byte boundary (e.g., 4 bytes) used by version of operation 412 in FIG. 4A.

Although SIMD register 428 contains eight data elements and SIMD register 410 contains four data elements, both SIMD registers contain the same amount of data. The difference in the number of data elements is due to the fact that the data elements in SIMD register 410 are 4-byte data elements while the data elements in SIMD register 428 are 2-byte data elements. Also, operations 422 and 426 operate on 2-byte boundaries.

In another technique (to handle the situation where the SIMD minimum position instruction is based on a byte boundary that is less than the byte boundary of data elements in a SIMD register), a shuffling of the first register is performed to copy only the lower order bytes of each data value in the first register into another register (or the same register). For example, the first and second bytes are copied into the third and fourth positions in the register (or a different register), the fourth and fifth bytes are copied into the sixth and seventh positions in the register (or different register) and so forth. An example mask that is used to perform the shuffle is {0,1,0,1,4,5,4,5,8,9,8,9,12,13,12,13}.

The result of the shuffling may be stored in the same register in which the original values were read in from the hash table or in a different register. After the shuffling is performed, the minimum position instruction of block 330 is performed.

Figure 4C:
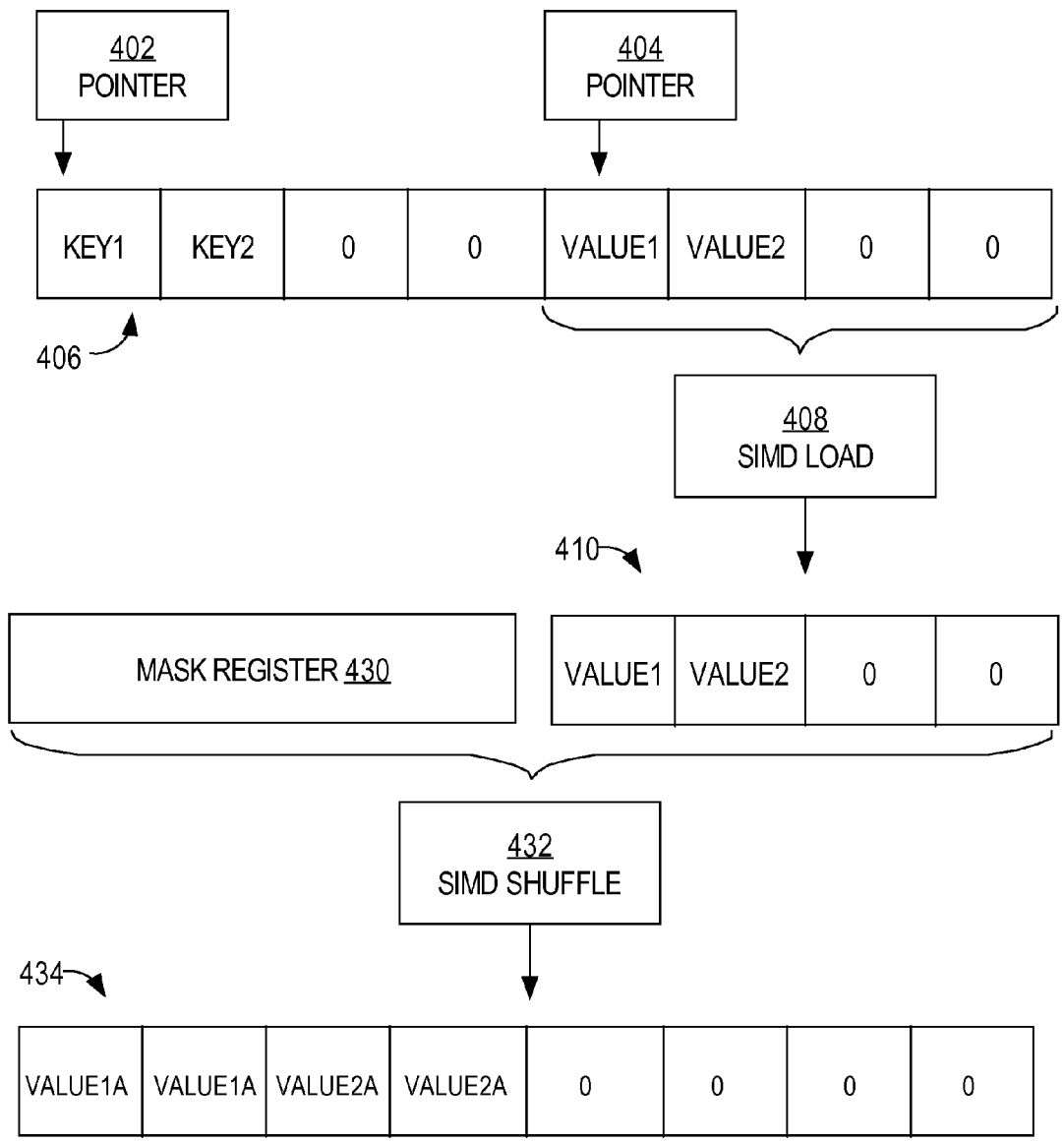
FIG. 4C is a block diagram that depicts another technique for identifying a minimum value in a SIMD register, in an embodiment.

FIG. 4C is a block diagram that depicts this second technique, in an embodiment. In FIG. 4C, In FIG. 4B, SIMD mask register 430 includes a mask, such as {0,1,0,1,4,5,4, 5,8,9,8,9,12,13,12,13} described above. The mask may be stored in SIMD mask register 430 throughout the process of generating the hash table or may be loaded on demand. Operation 432 is a SIMD shuffle operation that takes, as input, the contents of SIMD register 410 and SIMD mask register 430. The output of operation 432 is stored in SIMD register 434 (which may be the same as SIMD register 410), the contents of which operation 412 takes as input. In this second technique, operation 412 (a SIMD MIN POS operation) operates on a different byte boundary (e.g., 2 bytes) than the byte boundary (e.g., 4 bytes) used by version of operation 412 in FIG. 4A.

The result of finding the minimum position is a set of values that includes the value that is determined to be the minimum value and a value that indicates a position in the register of the minimum value. A SIMD instruction is then executed to retrieve or extract the minimum value.

In FIG. 4A, operation 416 is a SIMD operation that is performed to extract a data element from a certain (e.g., first) position in SIMD register 414, which position depends on the implementation of operation 412. Operation 416 is initiated by executing a SIMD extract instruction. Example SIMD code is "m2=_mm_extract_epi16(m2,0)", where "m2" refers to a SIMD register (e.g., SIMD register 414), "_mm_extract_epi16" is the name of a SIMD extract instruction, and '0' refers to the $0^{th}$ position in the SIMD register.

In an embodiment where the search for a free slot in block 330 involves identifying the minimum value in a SIMD register, it is then determined whether the minimum value is zero. If so, then process 300 proceeds to block 335. Else, process 300 proceeds to block 340. A minimum value of zero indicates that a slot in the bucket (identified based on the hash value) is available for inserting the key and the corresponding value. A minimum value that is non-zero indicates that no slots in the bucket (of the hash table) are open or available for inserting the key and corresponding value.

At block 335, the key and value are inserted into the appropriate slot in the hash table. Block 335 may be performed as follows. First, the position of the minimum value from is SIMD register is retrieved or extracted. This may be performed by executing a SIMD instruction (e.g., "_mm_extract_epi16(m2, 1)", where '_mm_extract_epi16' is the name of the instruction, 'm2' is the name of the register, and '1' is the second position in the register, which position is where the slot position is indicated).

In FIG. 4A, operation 418 is a SIMD operation that is performed to extract a data element from a certain (e.g., the second) position SIMD register 414, which position depends on the implementation of the operation 412.

If the slot position is based on a different byte boundary than the byte boundary of the entry in the hash table, then the slot position is modified. For example, if the slot position is based on a 2-byte boundary and the entry in the hash table is based on a 4-byte boundary, then the slot position is divided by two (e.g., using the ">>=" instruction). For example, if the slot position of the zero value in the register is four, then the slot position in the hash entry is two.

Code for inserting the key and the data value (received in block 305) into the bucket (identified by the hash value generated in block 310) of the hash table may be as follows:
  hashTable[hashvalue1][slotid]=key;
  hashTable[hashvalue1][slotid+NUM_KEYS_IN_BUCKET]=value;
where "hashTable" is the name of the hash table, "hashvalue1" is the hash value generated in block 310, "slotid" identifies a free slot in the bucket identified by the hash value, and "NUM_KEYS_IN_BUCKET" indexes into the data value (or payload) portion of the bucket.

Blocks 340-365 are similar to blocks 310-335 except with a different hash value. This portion of process 300 corresponds to the "cuckoo" feature of generating a hash table.

At block 340, a second hash value is generated based on the key. Block 340 may be performed by passing the key to a second hash function which, when executed, produces the second hash value. The second hash function is different than the first hash function (used in block 310). The second hash function may be implemented in hardware or software.

At block 345, the second hash value is used to lookup, in the hash table, an entry that includes one or more values that correspond to one or more keys. In some cases, the entry may not include any values. In other cases, the entry may be full in that no additional values may fit into the entry.

At block 350, the entry is loaded into a SIMD register. The loading of a number of values from the hash table is performed by executing a SIMD load instruction.

At block 355, a search is performed to identify a free slot in the bucket. This block is performed by executing one or more SIMD instructions. Block 355 corresponds to block 330. Thus, a result of finding the position in the register may be a set of values that includes the value that is determined to be the minimum value and a value that indicates a position in the register of the minimum value. Similarly, block 355 may involve executing a SIMD instruction to retrieve or extract the minimum value and then determining whether the minimum value is zero. If so, then an available slot has been found and process 300 proceeds to block 360. Else, process 300 proceeds to block 365.

At block 360, the key and data value are inserted into the slot of the bucket identified by the second hash value (generated in block 340).

At block 365, it is determined whether the key and data value have already been evicted. If so, then process 300 proceeds to block 370. Else, process 300 proceeds to block 375.

At block 370, the key and data value are inserted in a data structure that is different than the hash table. For example, the data structure may be another hash table that is structured similar to the hash table. The process for identifying an empty slot in the separate data structure may be the same as or different than the process for identifying an empty slot described previously.

Figure 4D:
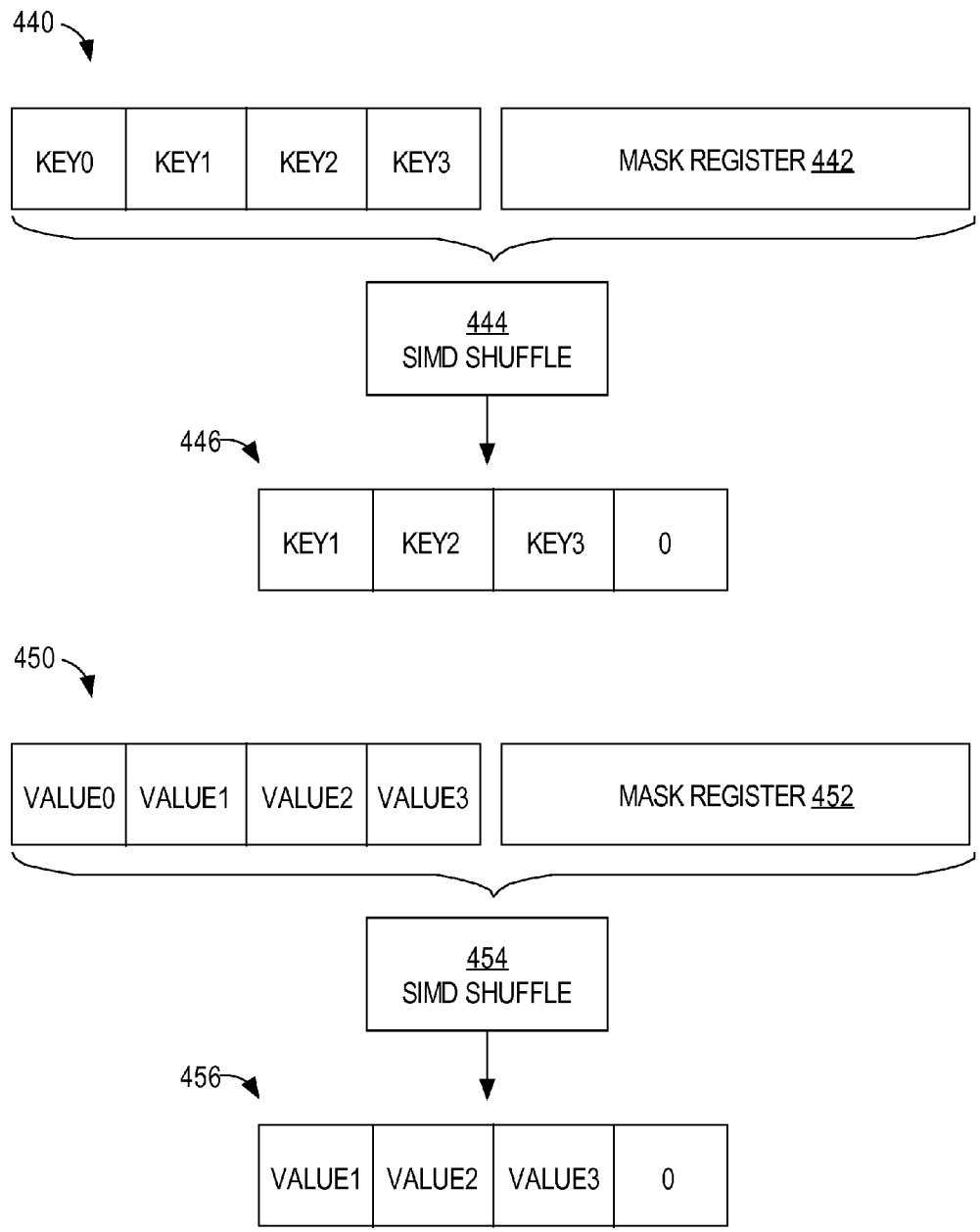
FIG. 4D is a block diagram that depicts a flow of data and operations that are performed in order to evict a key and data value from a slot of a hash bucket, in an embodiment.

At block 375, a slot in one of the buckets (identified by the first hash value or the second hash value) is selected for eviction and the key and data value are stored in that evicted bucket. FIG. 4D is a block diagram that depicts a flow of data and operations that are performed in order to evict a key and data value from a slot of a bucket, in an embodiment.

The keys from the bucket (identified by the second hash value) are loaded into a SIMD register 440. Such a load may be initiated by executing the following SIMD code: "m2=_mm_load_si128((_m128i*)htentry_evict);", where "m2" refers to the register into which keys are loaded, "_mm_load_si128" is the name of a SIMD load instruction, and "htentry_evict" is the name of a pointer to a bucket where the keys are located in the hash table.

Operation 444 is a SIMD shuffle operation that takes, as input, the contents of SIMD register 440 and SIMD mask register 442. SIMD register 442 includes a shuffle mask, such as {4,5,6,7,8,9,10,11,12,13,14,15,0x80,0x80,0x80,0x80}, wherein "0x80" indicates a zero or empty value. Operation 444 may be initiated by executing the following SIMD code: "m2=_mm_shuffle_epi8(m2,mask)", where "m2" refers to the register that will store the output of operation 444, "_mm_shuffle_epi8" is the name of a SIMD shuffle instruction (which operates on 8-bt boundaries), and "mask" refers to the register that contains the mask. Operation 444, in conjunction with the contents of SIMD mask register 442, effectively drops the evicted key and causes an output register (i.e., SIMD register 446, in this example) to contain a slot for the new key. Thus, the output of operation 444 is stored in SIMD register 446, which may be the same register as SIMD register 440.

A similar set of instructions are executed for the data value portion of the bucket in which a key and data value were evicted. The data values from the bucket (identified by the second hash value) are loaded into a SIMD register 450. Such a load may be initiated by executing the following SIMD code: "m3=_mm_load_si128((_m128i*)htentryrid_evict);", where "m3" refers to the register into which keys are loaded, "_mm_load_si128" is the name of a SIMD load instruction, and "htentry_evict" is the name of a pointer to a bucket where the keys are located in the hash table.

Operation 454 is a SIMD shuffle operation that takes, as input, the contents of SIMD register 450 and SIMD mask register 452. SIMD register 452 includes a shuffle mask, such as {4,5,6,7,8,9,10,11,12,13,14,15,0x80,0x80,0x80,0x80}, wherein "0x80" indicates a zero or empty value. Operation 454 may be initiated by executing the following SIMD code: "m3=_mm_shuffle_epi8(m2,mask)", where "m3" refers to the register that will store the output of operation 454, "_mm_shuffle_epi8" is the name of a SIMD shuffle instruction (which operates on 8-bt boundaries), and "mask" refers to the register that contains the mask. Operation 454, in conjunction with the contents of SIMD mask register 452, effectively drops the evicted key and causes an output register (i.e., SIMD register 456, in this example) to contain a slot for the new key. Thus, the output of operation 454 is stored in SIMD register 456, which may be the same register as SIMD register 450.

Figure 4E:
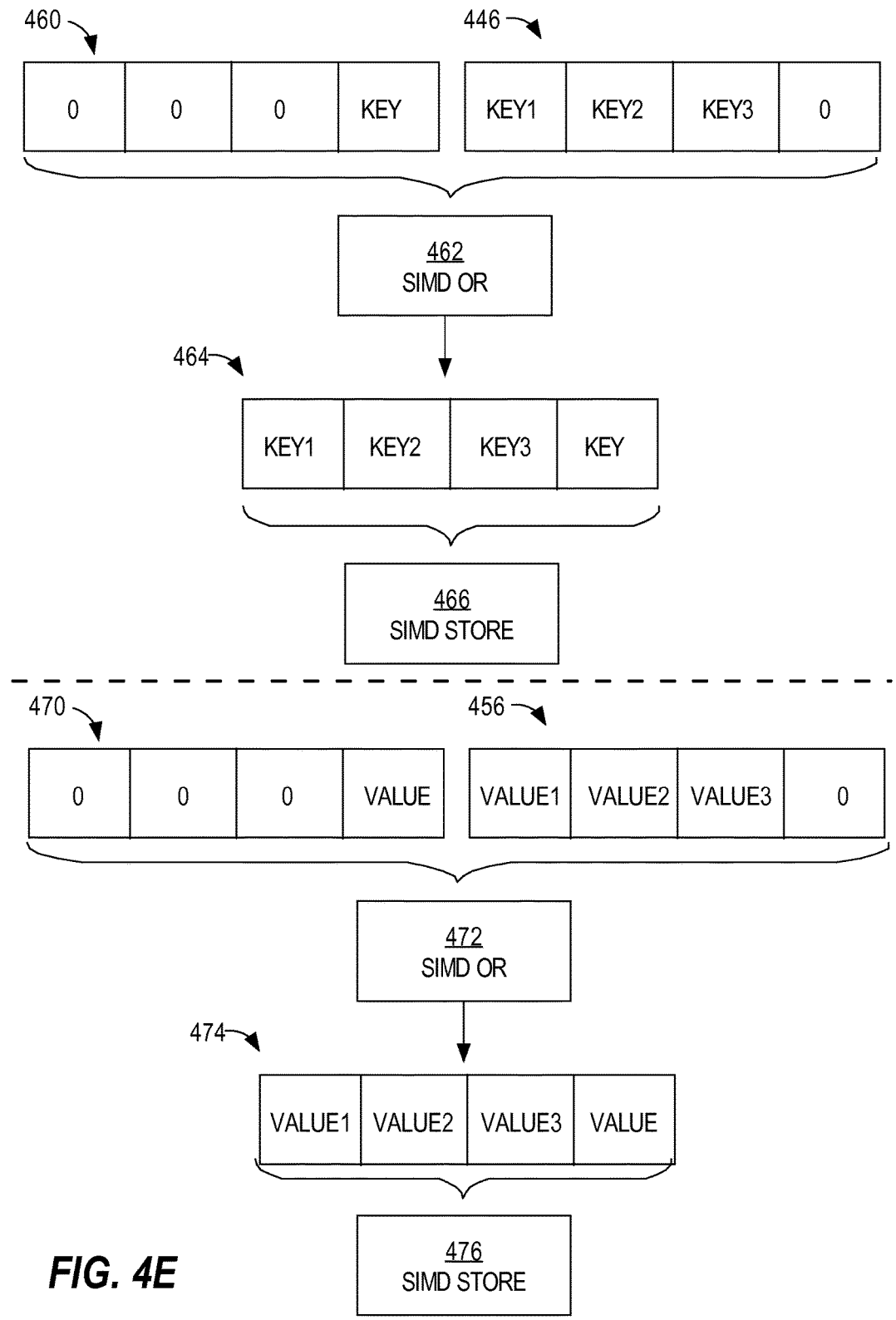
FIG. 4E is a block diagram that depicts a flow of data and operations that are performed in order to insert a key and a data value into the hash bucket from which another key and data value were evicted, in an embodiment.

FIG. 4E is a block diagram that depicts a flow of data and operations that are performed in order to insert the key and data value (received in block 305) into the bucket from which a key and data value were evicted, in an embodiment. The key to be inserted is inserted into a SIMD keymask register 460. Operation 462 is a SIMD OR operation that takes, as input, the contents of SIMD register 460 and the contents of SIMD register 446. Operation 462 may be initiated by executing the following SIMD code: "m2=_mm_or_si128(m2, keymask);", wherein "m2" corresponds to SIMD register 446 and "keymask" corresponds to SIMD register 460. The output of operation 462 is stored in SIMD register 464, which may be the same as SIMD register 460 or SIMD register 446.

Operation 466 is then performed to cause the contents of SIMD register 464 to be stored in the hash table. Operation 466 may be initiated by executing the following SIMD code: "_mm_store_si128((_m1128i*) htentry, m2);", wherein "m2" refers to SIMD register 464, "_mm_store_si128" is a SIMD store instruction, and "htentry" refers to the bucket in the hash table from which the keys were loaded.

A similar set of instructions are executed for the data value portion of the bucket in which a key and data value were evicted. The data value to be inserted is inserted into a SIMD keymask register 470. Operation 472 is a SIMD OR operation that takes, as input, the contents of SIMD register 470 and the contents of SIMD register 456. Operation 472 may be initiated by executing the following SIMD code: "m3=_mm_or_si128(m2, ridmask);", wherein "m3" corresponds to SIMD register 456 and "ridmask" corresponds to SIMD register 470. The output of operation 472 is stored in SIMD register 474, which may be the same as SIMD register 470 or SIMD register 456.

Operation 476 is then performed to cause the contents of SIMD register 474 to be stored in the hash table. Operation 476 may be initiated by executing the following SIMD code: "_mm_store_si128((_m1128i*) htentryrid, m3);", wherein "m3" refers to SIMD register 474, "_mm_store_si128" is a SIMD store instruction, and "htentryrid" refers to the bucket in the hash table from which the data values were loaded.

At block 380, process 300 is initiated again, except the key and data value to be inserted are the key and data value that were evicted in block 375.

Hash Table Probe without Duplicates

In some join operations, the join column is unique. Thus, each key from the join column is unique. Based on this knowledge, one approach for probing a hash table based on a key from a probe relation (or table) is followed. In contrast, if the join column is not unique, then a different approach for performing the probe phase of the join operation is followed. Such a different approach is described below in the section entitle, "HASH TABLE PROBE WITH DUPLICATES."

Figure 5A:
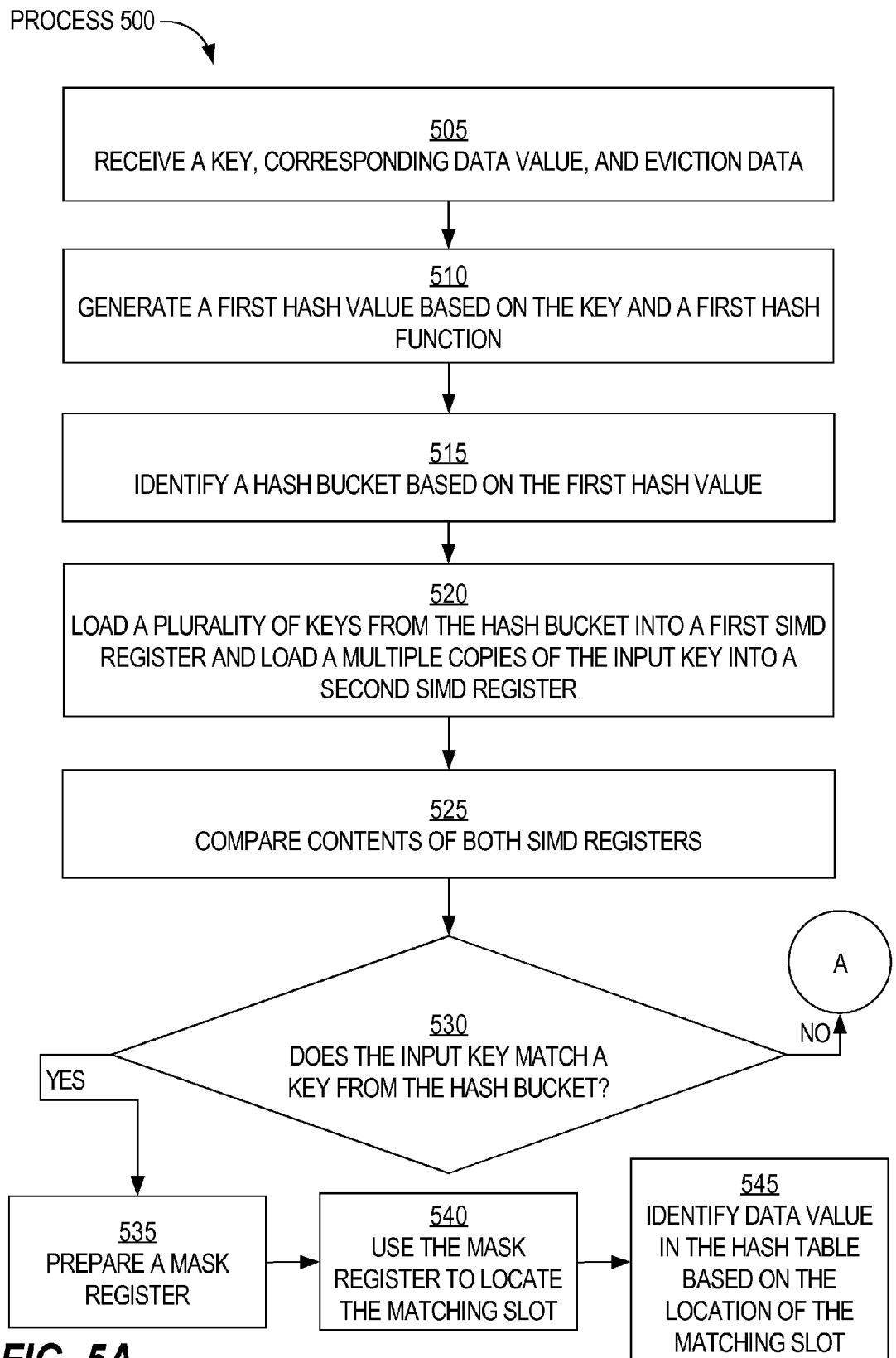
FIGS. 5A-5B is a flow diagram that depicts a process for performing a probe into a hash table based on a single key-data value pair from a probe relation, in an embodiment.
Figure 5B:
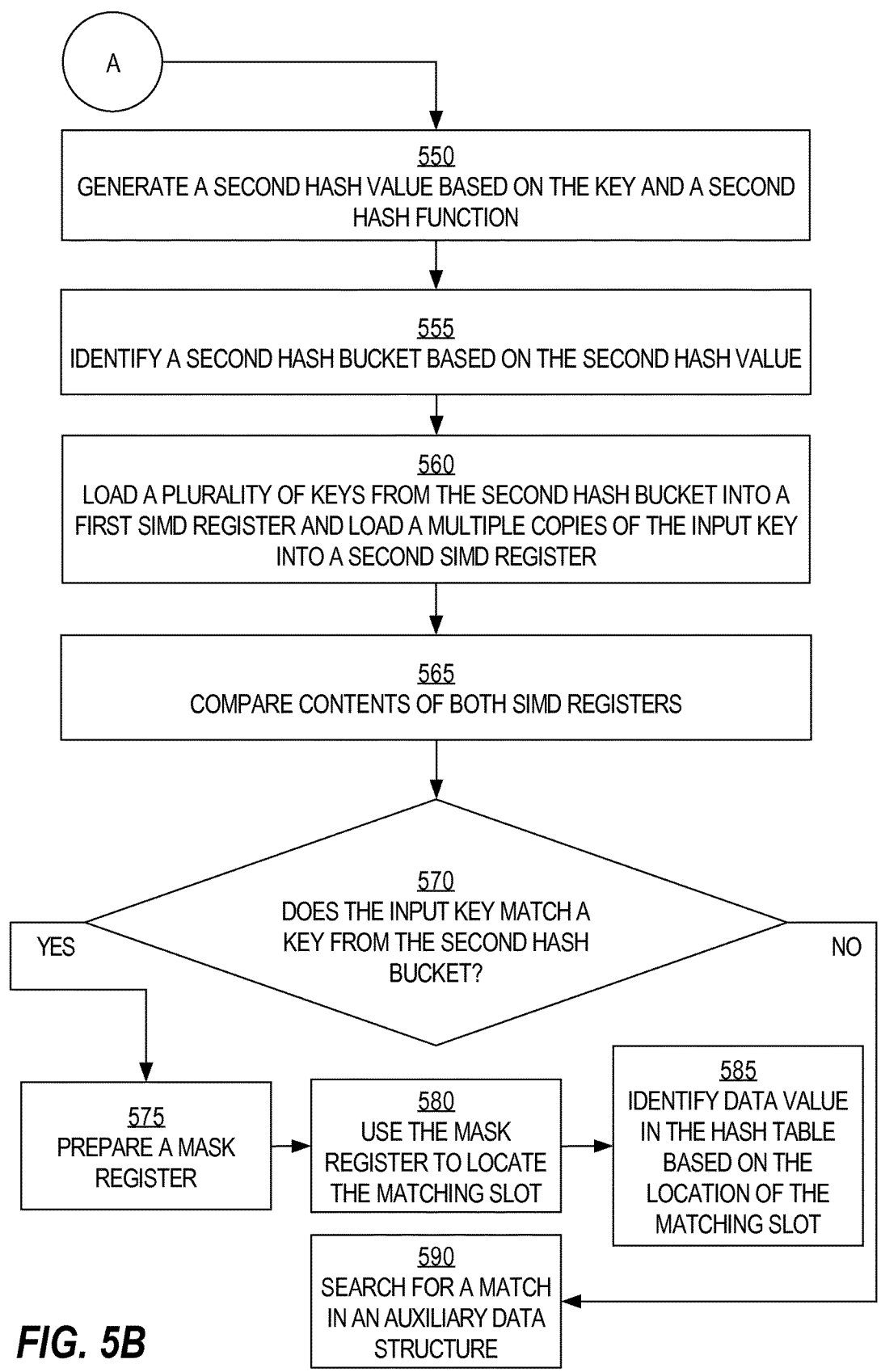

FIGS. 5A-5B is a flow diagram that depicts a process 500 for performing a probe into a hash table based on a single key-data value pair from a probe relation, in an embodiment. While the following example describes the key and the data value as being 4-byte values and SIMD registers as being 128-bit registers, process 500 is applicable to data elements having different byte boundaries and/or registers having different bit capacities.

At block 505, a key is received. The key is from a probe relation (or table). The key may be received in response to a function call to probe a hash table based on the key. Block 505 may also involve receiving a "result" value, which is the output variable to the function call. The function does not use the value of the result; instead, the function fills the result value when there is a match.

At block 510, a first hash value is generated based on the key.

At block 515, a bucket in the hash table is identified based on the first hash value. The bucket may or may not have empty slots.

At block 520, a first SIMD register is loaded with the keys from the bucket and a second SIMD register is loaded with multiple copies of the key.

Figure 6A:
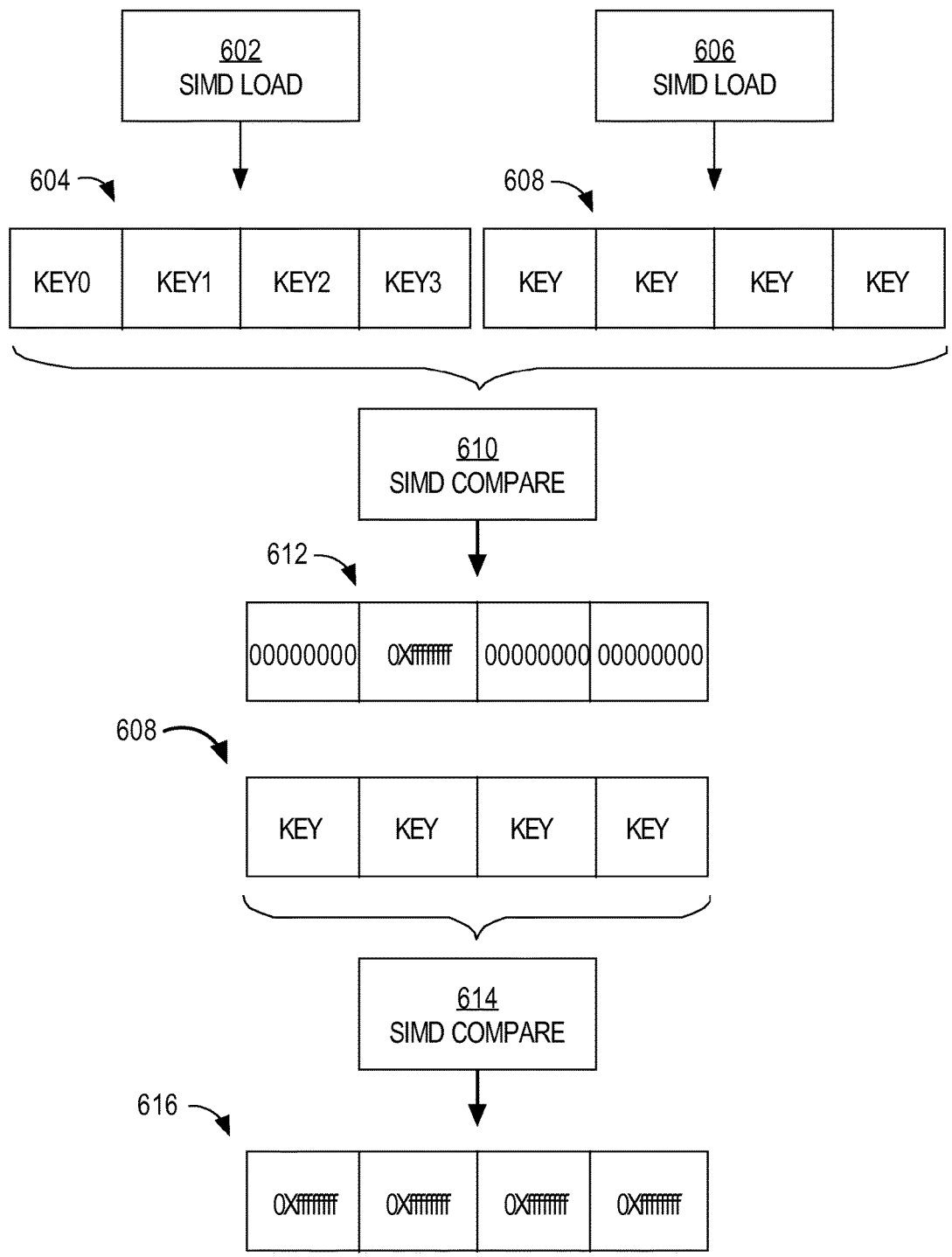
FIGS. 6A-6B are block diagrams that depicts a flow of data and operations that are performed to determine whether a key exists in a bucket, in an embodiment.
Figure 6B:
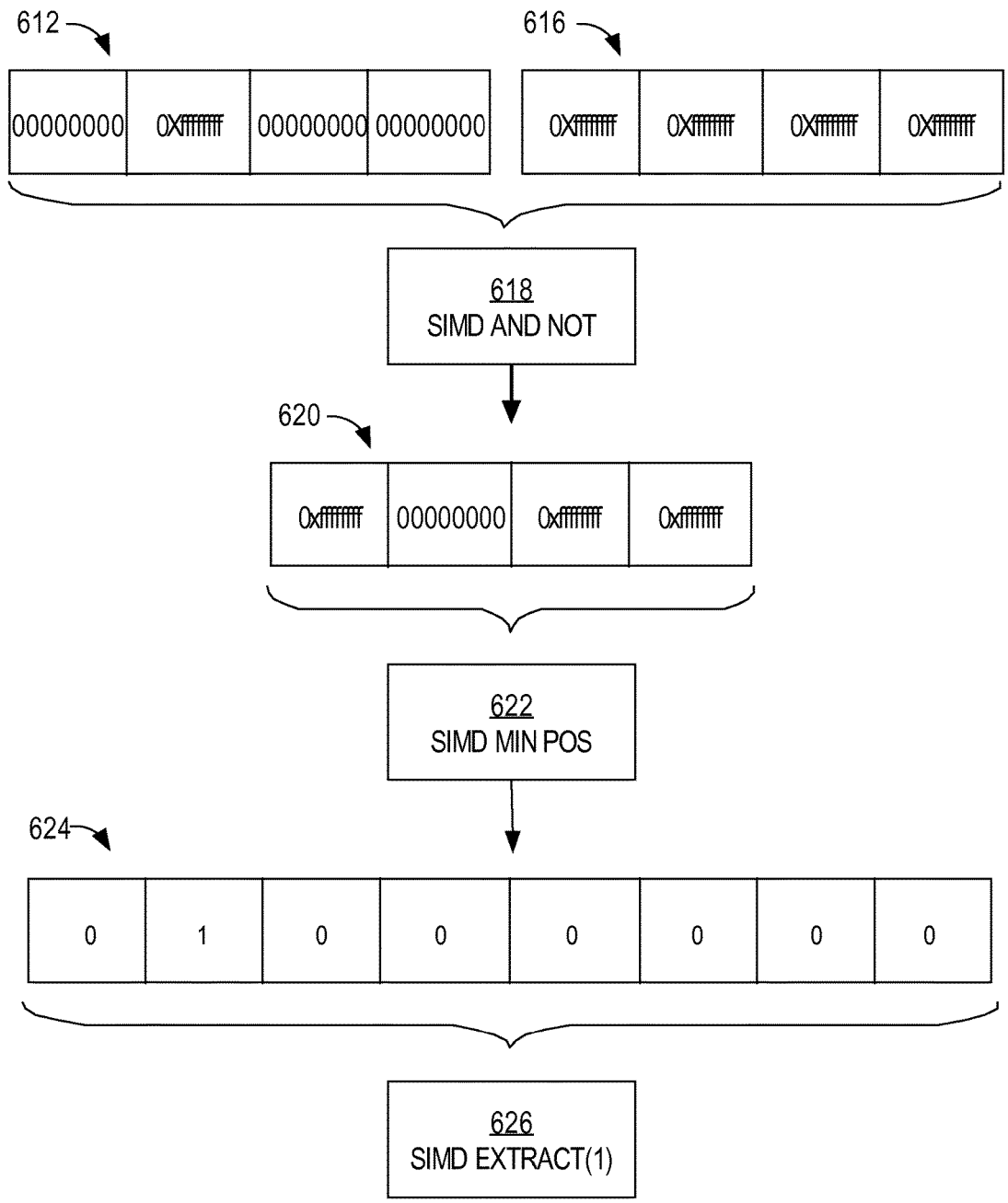

FIGS. 6A-6B are block diagrams that depicts a flow of data and operations that are performed to determine whether a key exists in a bucket, in an embodiment. In FIG. 6A, operation 602 is a SIMD load operation that, when performed, loads the keys from the bucket into a SIMD register 604. Example SIMD code for loading the keys from the bucket is as follows: "m1=_mm_load_si128((_m128i*)htentry);", where "m1" is the SIMD register into which keys are loaded, "_mm_load_si128" is the name of a SIMD load instruction, and "htentry" is pointer to the hash bucket indicated by the first hash value.

In FIG. 6A, operation 606 is a SIMD set operation that loads multiple copies of the key into a SIMD register 608. Example SIMD code for loading multiple copies of the key into a SIMD register is as follows: "key1=_mm_set_epi32 (k1, k1, k1, k1);", where "k1" is the key, "key1" refers to the SIMD register into which the copies of key k1 are loaded, and "_mm_set_epi32" is the name of a SIMD set instruction.

At block 525, the contents of both SIMD registers are compared using a SIMD instruction. In FIG. 6A, operation 610 is a SIMD compare operation that takes, as input, contents from SIMD register 604 and contents from SIMD register 608. The output of operation 610 is stored in a SIMD register 612, which may be the same register as SIMD register 604 or SIMD register 608. Example SIMD code for comparing contents of two SIMD registers is as follows: "mask1=_mm_cmpeq_epi32(key, key1);", where "key1" refers to a SIMD register, "_mm_cmpeq_epi32" is the name of a SIMD compare instruction, and "mask1" is a SIMD register that stores the output of executing the SIMD compare instruction.

In the depicted example of FIG. 6A, the second key in the hash bucket matches the key received in block 505. Therefore, the contents of SIMD register 612 indicate is for the second slot and 0s for the other slots.

At block 530, it is determined whether the output of the compare operation indicates that the key matches a key in the hash bucket indicated by the first hash value. This determination may be performed using a SIMD instruction. For example, a SIMD instruction may be one that, when executed against the output of the compare operation, returns a value (e.g., 1 or 0) that indicates whether a SIMD register contains all 0s. An example of such a SIMD instruction is as follows: "_mm_test_all_zeros(m1,m1)." As another example, the SIMD instruction may be one that, when executed against the output of the compare operation, determines the maximum value in the output. If the maximum output is 0, then the key does not match any key in the bucket indicated by the first hash value.

If it is determined, at block 530, that the key matches a key in the hash bucket, then process 500 proceeds to block 535. Otherwise, process 500 proceeds to block 550.

At block 535, a SIMD mask register is operated on to contain all 1s. Such an operation may involve executing a SIMD compare instruction that takes, as input, SIMD register 608, at least when SIMD register 608 contained multiple copies of the received key. Thus, block 535 may be performed before block 525. An alternative approach for operating on a SIMD mask register to contain all is to generate a 128-bit (or 256-bit, depending on the size of the SIMD register) value in memory, and then read that value into the SIMD mask register. However, such an approach is many cycles longer than executing a SIMD compare instruction using existing contents of a SIMD register (e.g., SIMD register 608). Regardless of how the SIMD mask register is operated on to contain all 1s, block 535 may only be performed once, since the SIMD mask register may be used by multiple (or all) instances of key-data value pairs that are used to probe the hash table.

In FIG. 6A, this compare instruction corresponds to operation 614, which is a SIMD compare operation. The output of operation 614 is stored in a SIMD register 616 and comprises all 1s, indicating that the key matches itself.

Because of the SIMD minimum position instruction that can determine the minimum value in a SIMD register, one goal is to ensure that the matching slot (if any) has all 0s. Alternatively, if a SIMD maximum position instruction exists and is used, then the goal would be to ensure that the matching slot (if any) has all 1s.

At block 540, the SIMD mask register is used to locate the matching slot. Block 540 may involve executing multiple SIMD instructions.

In FIG. 6B, operation 618 is a SIMD AND NOT operation that takes, as input, SIMD register 612 and SIMD register 616 and produces output that is stored in a SIMD register 620, which may be the same as SIMD register 612 or SIMD register 616. Example SIMD code for performing a SIMD AND NOT operation is as follows: "m1=_mm_andnot_si128(m1, mask1);", where "_mm_andnot_si128" is the name of a SIMD AND NOT instruction, "m1" refers to a SIMD register, and "mask1" refers to a SIMD register that contains all 1s.

In the depicted example, SIMD register 620 contains 0s in the matching slot and is in the non-matching slots.

After the output of operation 618 is stored in SIMD register 620, operation 622 is performed. Operation 622 is a SIMD minimum position operation that takes, as input, SIMD register 620 and determines the minimum value in SIMD register 620 and the position in SIMD register 620 where the minimum value is located. Operation 622 produces output that is stored in SIMD register 624, which may be the same SIMD register as SIMD register 620. Example SIMD code for performing a SIMD minimum position operation is as follows: "m1=_mm_minpos_epu16(m1);". In one implementation, the SIMD minimum position operation stores the minimum value in the first position (or $0^{th}$ slot) in a SIMD register and stores "position data: in the second position in the SIMD register. "Position data" is data that indicates the position in the input SIMD register (i.e., SIMD register 620 in this example) where the minimum value is located.

Operation 626 is a SIMD extract operation that takes, as input, SIMD register 624, and extracts a value from a particular position in SIMD register 624. In this example, the particular position is the second position in SIMD register 624. The first position in SIMD register 624 does not need to be extracted because, at this point in process 500, it is known that a match was found.

At block 545, the data value in the hash table is identified based on the extracted value. The extracted value may be based on a byte boundary that is different than the byte boundary of the data elements in the hash table. For example, the extracted value may be a 2-byte value while data elements in the hash table may be 4-byte elements. In such a situation, an operation is performed on the extracted value.

For example, in FIG. 6B, the output of operation 626 may be stored as a variable, whose value is shifted by a shift operation by one bit, which effectively halves the value of the variable. The result of the shift operation is assigned to a location in the hash table. For example, if the variable is "slotid" and the hash bucket is identified by "hashvalue1", then the result value received in block 505 is stored at the following location in the hash table: "HashTable [hashvalue1][slotid]."

Once the data value that corresponds to the matched key is found, then the join operation proceeds. The portions of the join operation that do not involve process 500 may be performed without using any SIMD instructions.

At block 550 (which indicates that no match was found using the first hash value), a second hash value is generated based on the key. Blocks 550-580 are similar to block 510-545, except that the second hash value is used to identify a second hash bucket and, if it is determined that the key does not match any key in the second hash bucket, then one or more auxiliary data structures are searched (block 590) to determine whether the key is located in one of the auxiliary data structures. If not, then, depending on the type of join operation (e.g., outer join) that initiated the probe process, the data value that corresponds to the key received in block 505 may be ignored or may be used in an output relation (or table) that is generated based on the join operation.

Aggregation

As noted previously, aggregation is another database operation whose performance can benefit by using SIMD instructions. Example aggregation operations include sum, count, maximum, and minimum.

Figure 7A:
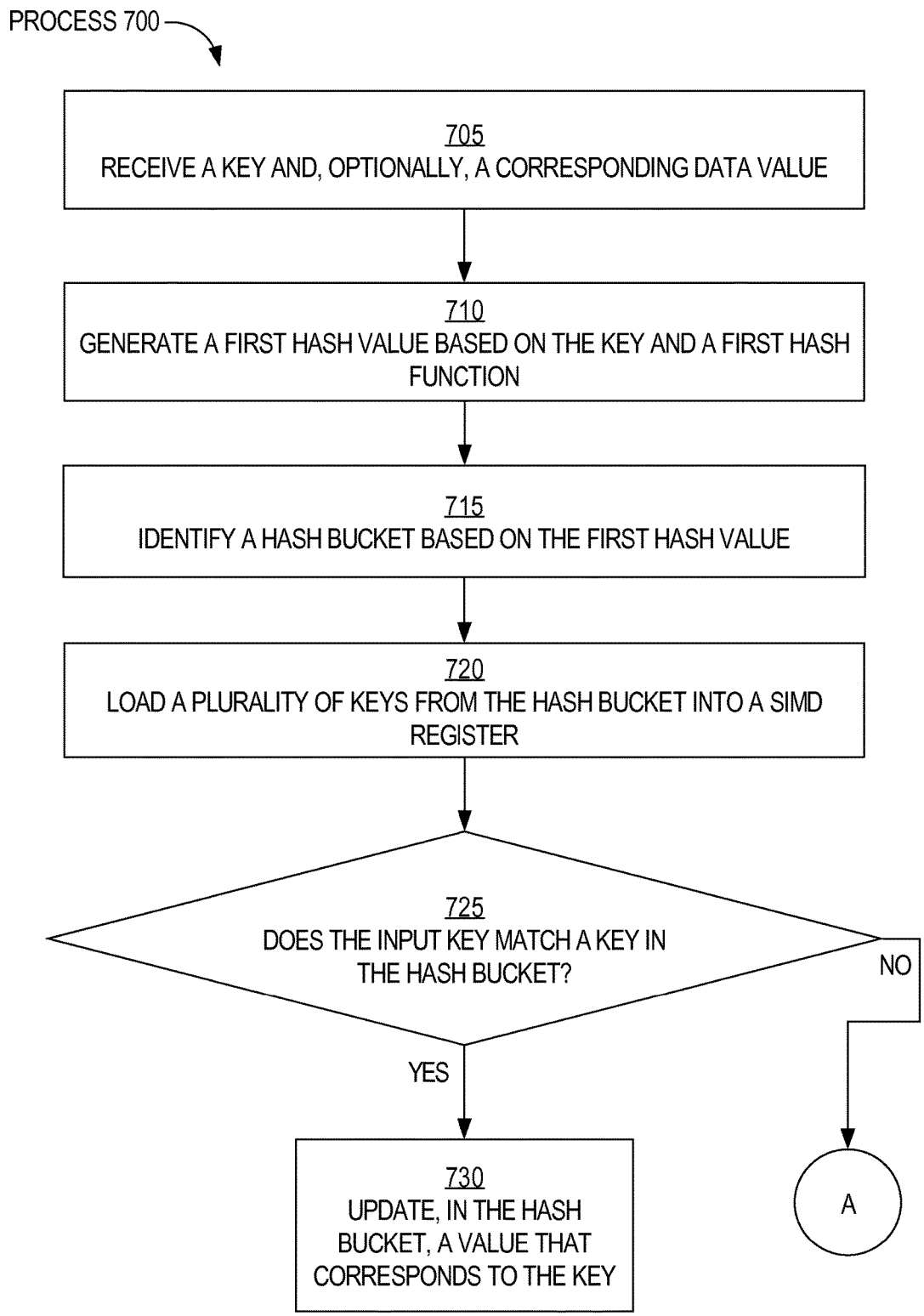
FIGS. 7A-7B is a flow diagram that depicts a process for performing an aggregation operation using one or more vectorized instructions, in an embodiment.
Figure 7B:
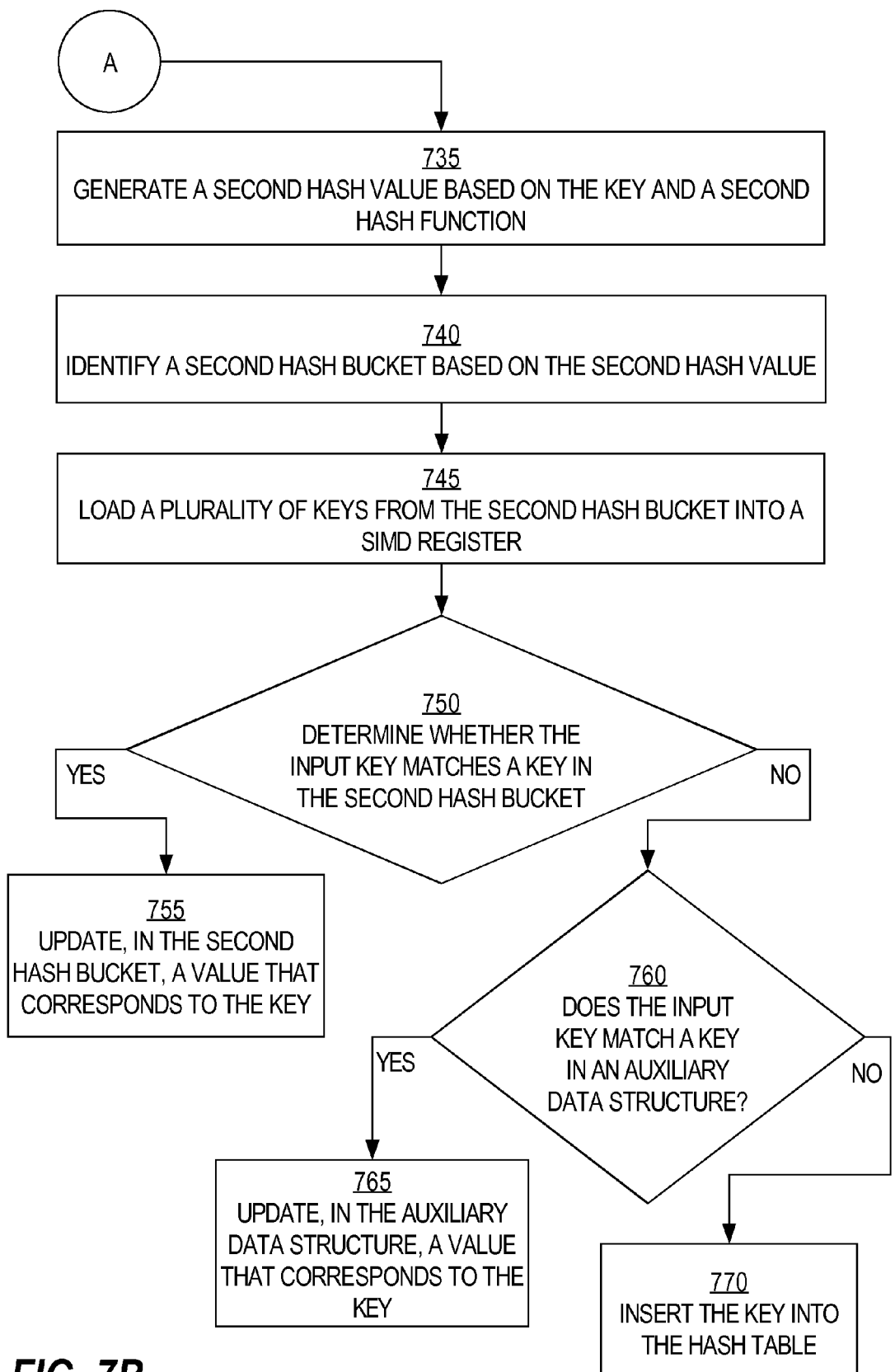

FIGS. 7A-7B is a flow diagram that depicts a process 700 for performing an aggregation operation using one or more vectorized instructions, in an embodiment.

At block 705, a key and a data value are received. The key is from a relation (or table). If the aggregation operation is count, then the data value is one. If the aggregation operation is sum, max, min, or average, then the data value is a value that corresponds to the key and that is also from the relation. The key may be received as part of a function call that includes the key and the aggregate data value as input parameters.

At block 710, a first hash value is generated based on the key using a first hash function.

At block 715, a bucket in a hash table is identified based on the first hash value. If no (or few) keys have yet been inserted in the hash table, then it is unlikely that the bucket will be full (i.e., not have any empty slots).

At block 720, the key(s) in the bucket are loaded into a SIMD register.

Figure 8A:
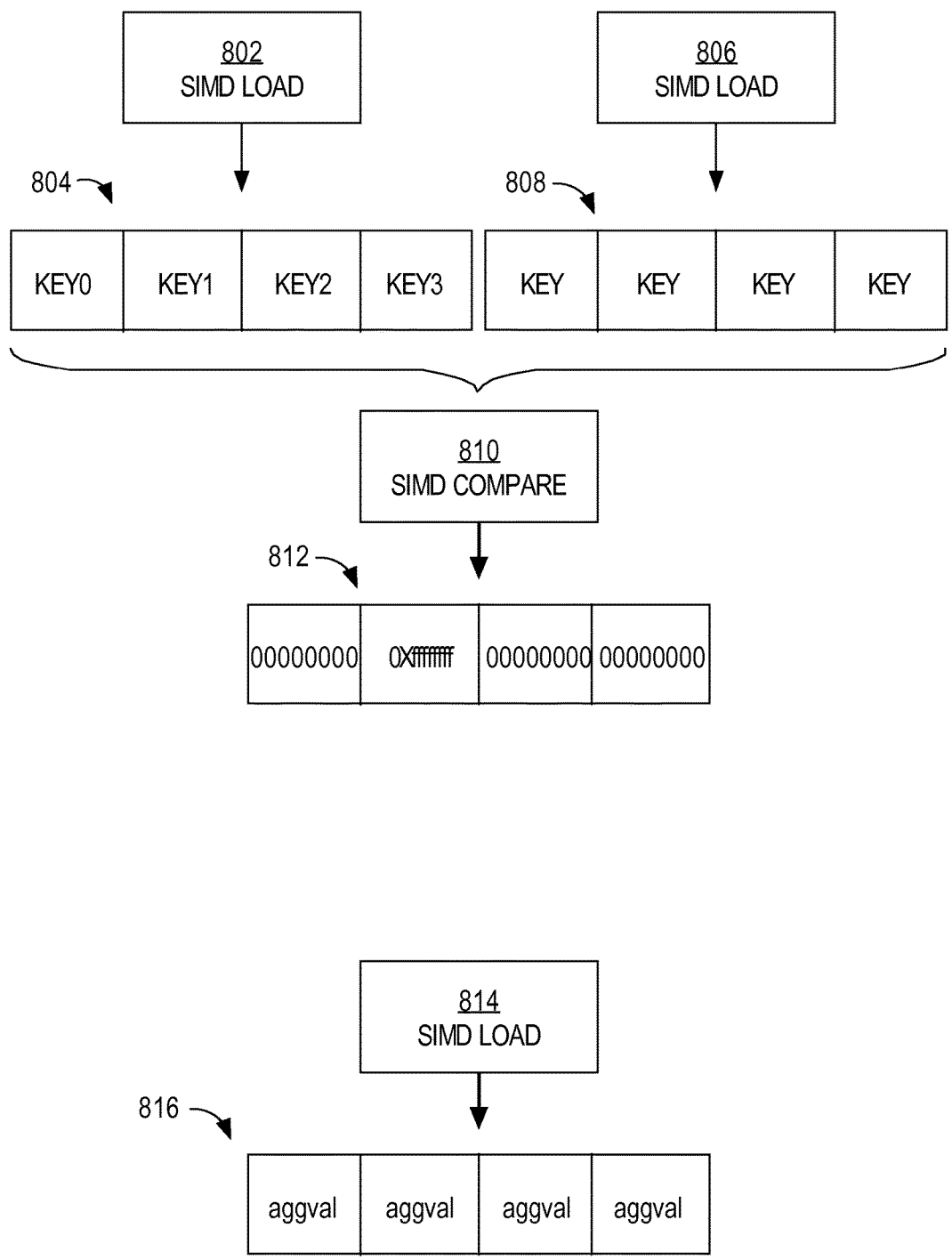
FIGS. 8A-8C are block diagrams that depict a flow of data and operations that are performed to execute an aggregation operation, in an embodiment.
Figure 8B:
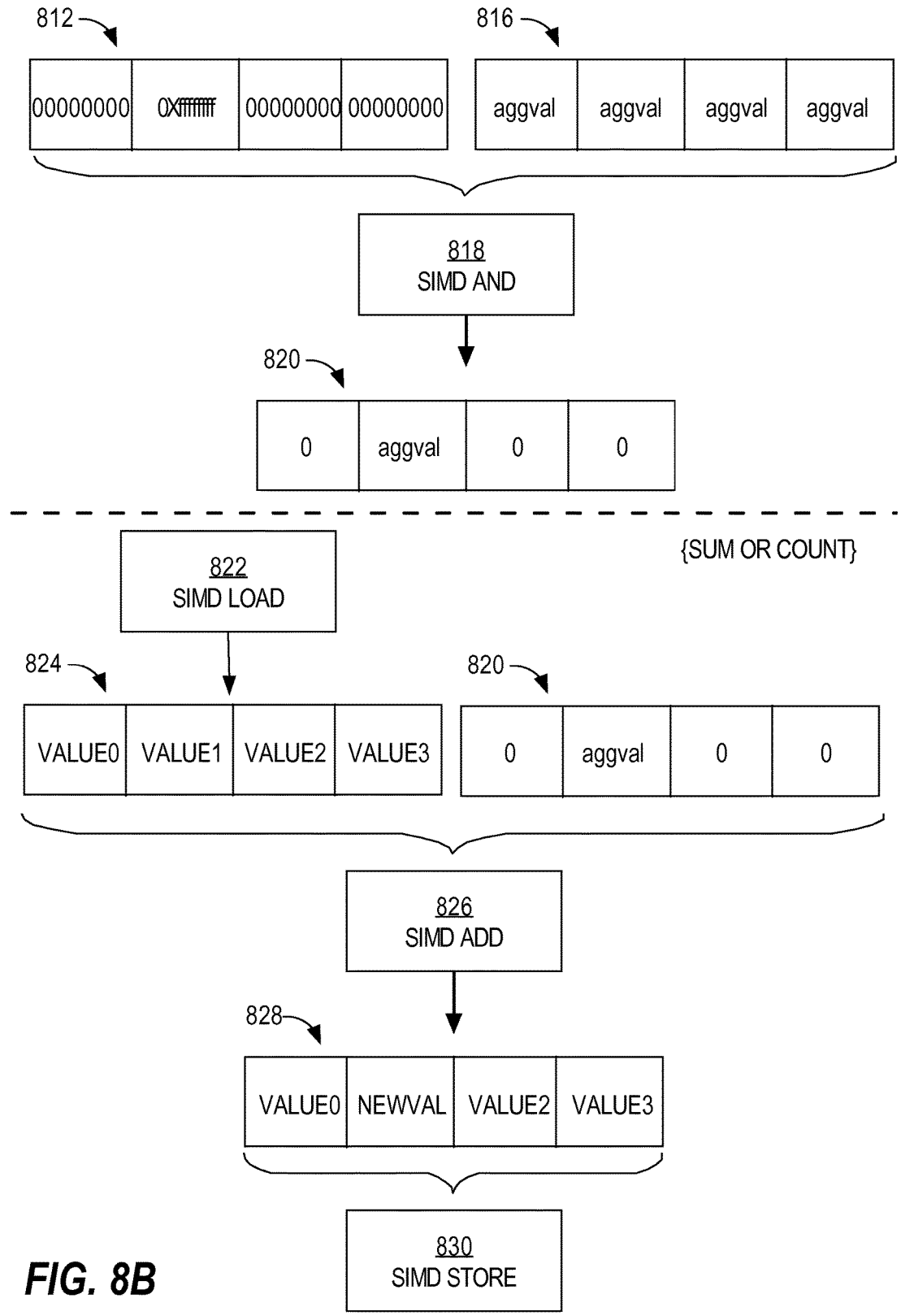
Figure 8C:
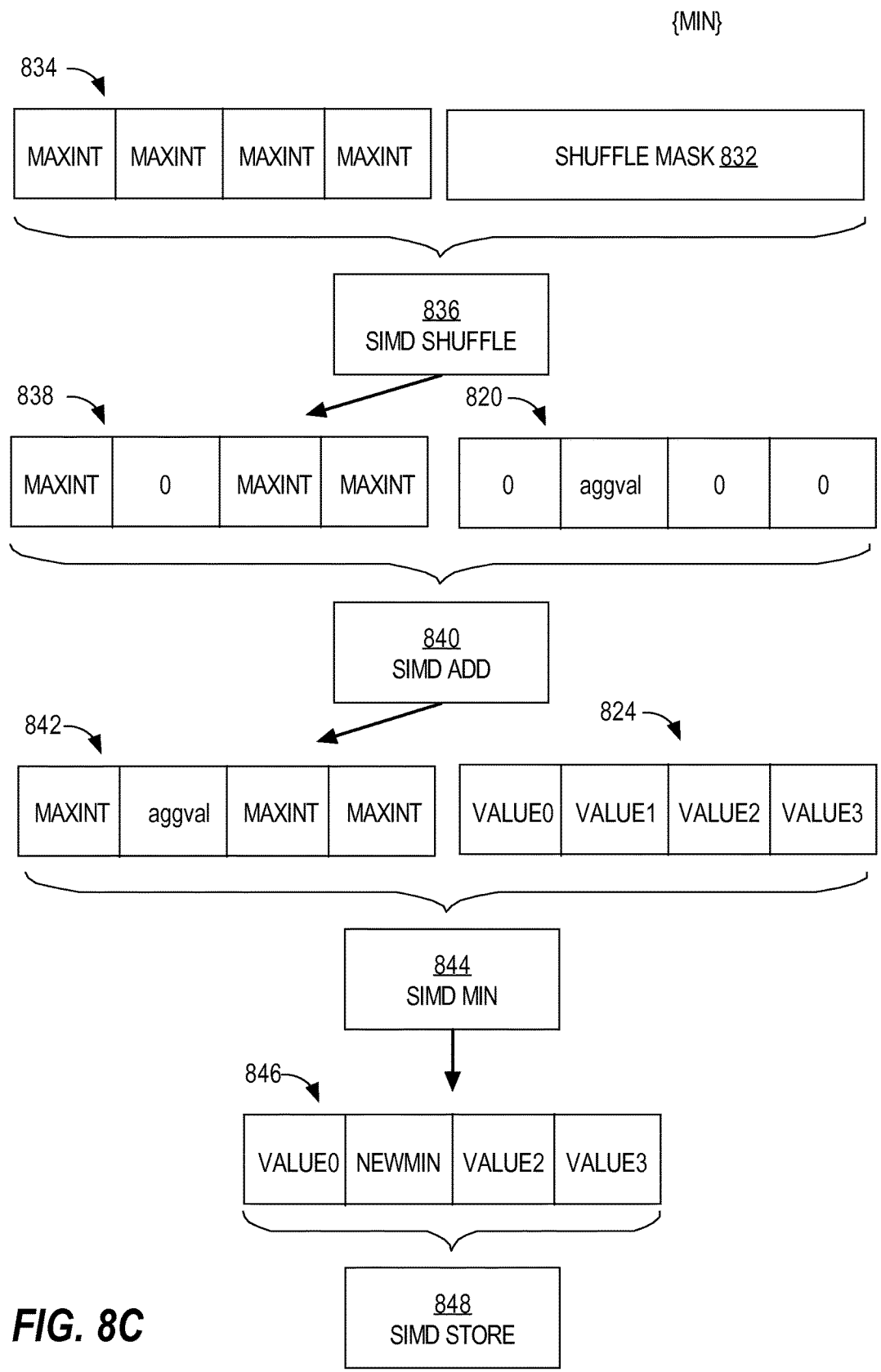

FIGS. 8A-8C are block diagrams that depict a flow of data and operations that are performed to execute an aggregation operation, in an embodiment. Block 720 may be performed by performing operation 802, which is a SIMD load operation, to load the keys in the bucket into a SIMD register 804. In this and other depicted examples, the bucket has four slots and each slot is filled or occupied by a key. In other examples, the bucket may have a different number of slots and some slots may be empty.

At block 725, it is determined whether the key received in block 705 matches a key in the bucket. Block 725 may be performed by performing the following operations indicated in FIG. 8. Operation 806, which is a SIMD set operation, when performed, sets multiple values in a SIMD register 808. Each data element in SIMD register 808 is set to be the same value as the key received in block 705. In other words, multiple copies of the key are inserted into SIMD 808.

Operation 810, which is a SIMD compare operation, when performed, compares contents from two SIMD registers to generate an output that indicates whether there is a match for the input key. In the depicted example, operation 810 takes, as input, the contents of SIMD register 804 and the contents of SIMD register 808 and generates output that is stored in SIMD register 812 (which may be the same as SIMD register 804 or SIMD register 808). In the depicted example, the key received in block 705 matches the key at the second position in the hash bucket. Another SIMD operation may be performed to determine that SIMD register 812 does not contain any matches. For example, a SIMD instruction, when executed, may determine whether the contents of a SIMD register are all zero or contains at least one non-zero bit. As described previously, an example of such a SIMD instruction is as follows: "_mm_test_all_zeros (m1,m1)."

At block 725, if it is determined that the key matches a key in the hash bucket, then process 700 proceeds to block 730. Otherwise, process 700 proceeds to block 735.

At block 730, the value that corresponds to the key (received in block 705) and that is located in the hash bucket (identified in block 715) is updated. The process of updating the appropriate value in the hash bucket is different depending on whether the aggregation is one of (1) sum and count or (2) maximum, minimum, and average. In other words, one or more operations that are performed for count and sum are different than the one or more operations that are performed for maximum, minimum. Some of the operations may be the same.

For example, in FIG. 8A, operation 814 is performed to set multiple values in a mask register. Operation 814 is a SIMD operation and the output of performing operation 814 is stored in SIMD register 816. As depicted, the contents of SIMD register 816 are multiple copies of a value entitled "aggval." If the aggregation is count, then the value of "aggval" is one. If the aggregation operation is sum, maximum, minimum, then the value of "aggval" is the data value received in block 705. Although depicted as occurring after operations 802, 806, and 810, operation 814 may be performed before any one (or all) of those operations.

After operation 814 is performed, operation 818 is performed to generate a mask. Operation 818 is a SIMD AND operation that takes, as input, the contents of SIMD register 812 and the contents of SIMD register 816. The output of operation 818 is stored in SIMD register 820, which may be the same as SIMD register 812 or SIMD register 816. A reason for operation 818 is to isolate the value that is to be aggregated in the appropriate slot of the hash bucket. For count and sum, the contents of SIMD register 816 will later be added to the value portion of the hash bucket.

Operation 822 is a SIMD load operation that loads a plurality of data values from the value portion of the hash bucket into a SIMD register. The output of performing operation 822 is stored in SIMD register 824, which may be the same as another SIMD register used before, except for SIMD register 820. Although depicted as occurring after operations 802, 806, 810, 814, and 818, operation 822 may be performed before any one (or all) of those operations.

The aforementioned operations in FIG. 8A-8B are common to count, sum, minimum, and maximum. For count and sum, operation 826 is performed. Operation 826 is a SIMD ADD operation that takes, as input, the contents of SIMD register 820 and the contents of SIMD register 824 and generates output that is stored in SIMD register 828, which may be the same as SIMD register 820 or SIMD register 824. The contents in SIMD register 828 are then stored in the hash bucket using operation 830, a SIMD load operation.

Example code that, when executed, causes a particular data value in a bucket of a hash table to be summed or counted is as follows:

```
mask1 = _mm_set_epi32(aggval,aggval,aggval,aggval); // copies of the
value used to
    //aggregate
key1 = _mm_set_epi32(k1, k1, k1, k1); // copies of the received key
idx1 = HASH1(k1); // HASH1 is a hash function
htentry = &(HashTable[idx1][0]); // identifying a bucket in the hash table
m1 = _mm_load_si128((__m128i *)htentry); // loading the keys from
the hash bucket
m1 = _mm_cmpeq_epi32(m1,key1);
if (!_mm_test_all_zeros(m1, m1)) { /* if at least one non-zero, then the
received key
    matches one of the keys in the bucket */
    mask1 = _mm_and_si128(mask1, m1);
    htentry += NUMBER_OF_KEYS_IN_BUCKET;
    m1 = _mm_load_si128((__m128i *)htentry); //load values that
    correspond to the
        //keys
    m1 = _mm_add_epi32(m1, mask1); //increase value in the
    appropriate slot
    _mm_store_si128((__m128i *)htentry, m1); // store result, which
    updates bucket
}
...
```

If the aggregation operation is for finding the minimum, then the following operations may be performed. The contents of SIMD register 820 are input to a SIMD operation that outputs position data that indicates a position in SIMD register 812 (or SIMD register 820) that does not contain all zeros. The SIMD operation may be performed by executing the following SIMD instruction: "_mm_movemask_ps(m1);", which takes the contents of SIMD register 812 (or SIMD register 820) as input and returns a value that indicates the position that has a non-zero value. The position may correspond to any byte boundary, such as 1 byte, 2 byte, 4 byte, etc. In the depicted example, the position corresponds to 4 byte boundaries. Thus, given the contents of SIMD register 812, the result of the SIMD operation may be '1', indicating the second position in SIMD register 812.

The position data is then used to identify a shuffle mask that will be used in a SIMD shuffle operation. If there are only four possible positions in a SIMD register, then one of four possible shuffle masks is selected. Similarly, if there are eight possible positions in a SIMD register, then one of eight possible shuffle masks is selected. The position data may be an index into an array of shuffle masks. In this example, a shuffle mask that corresponds to the shuffle mask indicated in SIMD register 832 is selected and loaded into that register. An example SIMD load instruction to load the shuffle mask is as follows: "m1=_mm_load_si128 ((_m128i*)&shufmask[_mm_mm_movemask_ps(m1)])." Example initialization code for "shufmask[ ]" is the following:

```
short shufmask[4][16]= {
    {0x80,0x80,0x80,0x80,4,5,6,7,8,9,10,11,12,13,14,15},
    {0,1,2,3,0x80,0x80,0x80,0x80,8,9,10,11,12,13,14,15},
    {0,1,2,3,4,5,6,7, 0x80,0x80,0x80,0x80,12,13,14,15},
    {0,1,2,3,4,5,6,7,8,9,10,11, 0x80,0x80,0x80,0x80}
};
```

Also, SIMD register 834 contains multiple values, each indicating a maximum value ("MAXINT"). The contents of SIMD register 834 may have been pre-loaded with the maximum values or may have been loaded in response to performance of block 705 or in response to determining that the aggregation operation is a minimum aggregation.

Operation 836 is a SIMD shuffle operation that takes, as input, contents from SIMD register 832 and contents from SIMD register 834 and generates output that is stored in SIMD register 838, which may be the same as SIMD register 832 or SIMD register 834. An effect of operation 836 is that the maximum values corresponding to non-target bucket slots are transferred to the output while zeroing out, in SIMD register 838, the position that corresponds to the target slot (i.e., the second position) of the hash bucket. Thus, FIG. 8B indicates that the maximum values are in the first, third, and fourth positions in SIMD register 838 and the second position in SIMD register 838 has a zero value.

Operation 840 is then performed to add in the aggregate value at the appropriate position. Operation 840 is a SIMD ADD operation that takes, as input, the contents of SIMD register 838 and the contents of SIMD register 820. The output of operation 840 is stores in SIMD register 842, which may be the same as another SIMD register used previously.

Operation 844 is then performed to determine a minimum value for each position in corresponding SIMD registers. Operation 844 is a SIMD MIN operation that takes, as input, the contents of SIMD register 824 (which contains the data values from the hash bucket identified in block 715) and the contents of SIMD register 842 to generate output that is stored in SIMD register 846. If for some reason a value in SIMD register 824 is the same as a maximum value indicated in SIMD register 842, then operation 844 ensures that one of those values appears in the output. Also, a result of performing operation 844 (in addition to preceding operations) is that the minimum value is determined for the appropriate slot in the hash bucket.

Operation 848 is then performed to load the contents of SIMD register 846 into the appropriate position in the hash bucket of the hash table.

Example code that, when executed, causes the appropriate data value in a bucket of a hash table to have the minimum value is as follows:

```
keymax = _mm_set_epi32(MAXINT, MAXINT, MAXINT, MAXINT);
/* corresponds
    to SIMD register 834 */
mask1 = _mm_set_epi32(aggval,aggval,aggval,aggval); // corresponds
operation 814
key1 = _mm_set_epi32(k1, k1, k1, k1); // corresponds to SIMD register
808
idx1 = HASH1(k1);
htentry = &(HashTable[idx1][0]);
m1 = _mm_load_si128((__m128i *)htentry); // corresponds to
operation 802
m1 = _mm_cmpeq_epi32(m1,key1); // corresponds to operation 810
if (!_mm_test_all_zeros(m1, m1)) {
    mask1 = _mm_and_si128(mask1, m1); // corresponds to operation
    818
    m1 = _mm_load_si128((__m128i
    *)&shufmask[_mm_movemask_ps(m1)]);
    key1 = _mm_shuffle_epi8(keymax, m1); //corresponds to operation
    836
    mask1 = _mm_add_si128(key1, mask1); // corresponds to operation
    840
    htentry += NUMBER_OF_KEYS_IN_BUCKET;
    m1 = _mm_load_si128((__m128i *)htentry); // corresponds to
    operation 822
    m1 = _mm_min_epi32(m1, mask1); // corresponds to operation 844
    _mm_store_si128((__m128i *)htentry, m1); // corresponds to
    operation 848
}
```

If the aggregation operation is maximum, then the SIMD operations that are used to perform the operation are similar to the SIMD operations that are used to perform a minimum aggregation operation. One difference between the two approaches is that instead of the contents of SIMD register

834 being MAXINT, the contents of SIMD register 834 may be multiple MININT values (if such a value exists), the largest negative values, or all zeros (which may be used if it is known that the data values in the hash bucket cannot be negative). Another difference if the aggregation operation is maximum is operation 844, which may be a SIMD MAX operation instead of a SIMD MIN operation.

At block 735 (which indicates that it is was determined that the key received in block 705 does not match a key in the hash bucket), a second hash value is generated based on the key and a second hash function that is different than the first hash function used to generate the first hash value.

At block 740, (similar to block 715), a second bucket in the hash table is identified based on the second hash value.

At block 745 (similar to block 720), the key(s) in the second bucket are loaded into a SIMD register.

At block 750 (similar to block 725), it is determined whether the key received in block 705 matches a key in the second bucket. If so, then process 700 proceeds to block 755; otherwise, process 700 proceeds to block 760.

At block 755 (similar to block 730), the value that corresponds to the key (received in block 530) and that is located in the second hash bucket (identified in block 740) is updated.

At block 760, it is determined whether the key received in block 705 matches a key in an auxiliary data structure, which itself may be a hash table. If so, then process 700 proceeds to block 765; otherwise, process 700 proceeds to block 770.

At block 765, the value that corresponds to the key (received in block 705) and that is located in the auxiliary data structure is updated.

At block 770, the key and the data value (if one was received in block 705) are inserted into the hash table. The process for inserting the key (and, optionally, the data value) may be the same as, or similar to, process 300 described above. Alternatively, a different process for inserting the key into the hash table may be used. Block 770 may be performed by calling a hash insert function that takes, as input parameters, the key, the data value (if necessary), the first hash value and the second hash value. In this way, the first hash value and the second hash value do not have to be re-calculated while performing the insert.

Data Compaction

"Data compaction" refers to the reduction of a number of elements without loss of information by eliminating unnecessary redundancy or removing irrelevancy. Data compaction is typically used in graphics processors (GPUs) that operate on images.

One use of data compaction involves selecting all "wanted" elements (e.g., represented by a '1') in an input data structure or input stream and placing only those wanted elements in an output data structure (e.g., array). The following pseudo-code involves a data compaction technique using a non-vectorized approach:

```
j = 0;
i = 0;
N = size of input array;
for (; i<N; i++)
{
```

```
    if(match[i] == 1)
    {
        output[j] = input[i];
        j++;
    }
}
``` where "input" is an input array of data elements, "match" is an array that indicates which corresponding data elements in the input array are "wanted" or "unwanted" (e.g., using 1s and 0s), and "output" is an output array that stores only the "wanted" data elements.

In an embodiment, data compaction is implemented using SIMD instructions. In an embodiment, one of the SIMD instructions is a shuffle instruction. The number of data elements N that can fit into a SIMD register is selected based on the input key size. For example, if the input key size is 4 bytes and the SIMD register is 128 bits, then N=4. Based on the value of N, the next N data elements (or N bytes or N bits) from a matching bit representation is selected and used to generate or select a shuffle mask, which is placed into a SIMD register. The SIMD shuffle mask register and the SIMD input register are input to a SIMD shuffle operation. The output of the SIMD shuffle operation is stored in a SIMD register, which may be the same as the SIMD input register or the SIMD shuffle mask register. The output SIMD register contains only matching values and, if there any unmatched slots, those slots contain all 0s (or another value that indicates unmatched slots). A SIMD instruction is used to count the number of matches for the N data elements. The matching data element(s) of the input register are moved to an output array and an output index into the output array is increased based on the number of data element(s).

In an embodiment, instead of generating the shuffle mask at runtime, all possible values of shuffle masks for each of the $2^N$ possible values of the matching bits. The pre-computed mask generation only needs to occur once and may be used throughout the lifetime of the program. The pre-computed mask generation may be performed manually (such that one or more users specify the values in each mask) or automatically. Pseudo-code for automatic generation is as follows:

```
unsigned char maskarray[2^N][2^N];
unsigned int is_bit_set(int a, int n)
{
    return (a & (1<<n));
}
int generate_mask( )
{
    unsigned int i,mult,j,k, cnt;
    for (i=0; i<2^N; i++)
    {
        cnt = 0;
        for(j=0; j<N ;j++)
        {
            mult = j*N;
            if (is_bit_set(i,j))
            {
                for(k=0; k<N; k++)
                    maskarray[i][cnt++] = mult+k;
            }
        }
        while(cnt<2^N)
        {
            maskarray[i][cnt++]=0x80;
        }
    }
}
```

In an embodiment, N (i.e., the number of data elements that fit into a SIMD register) is 4. In other embodiments, N may be 2, 8, or some other positive integer greater than 1.

Figure 9:
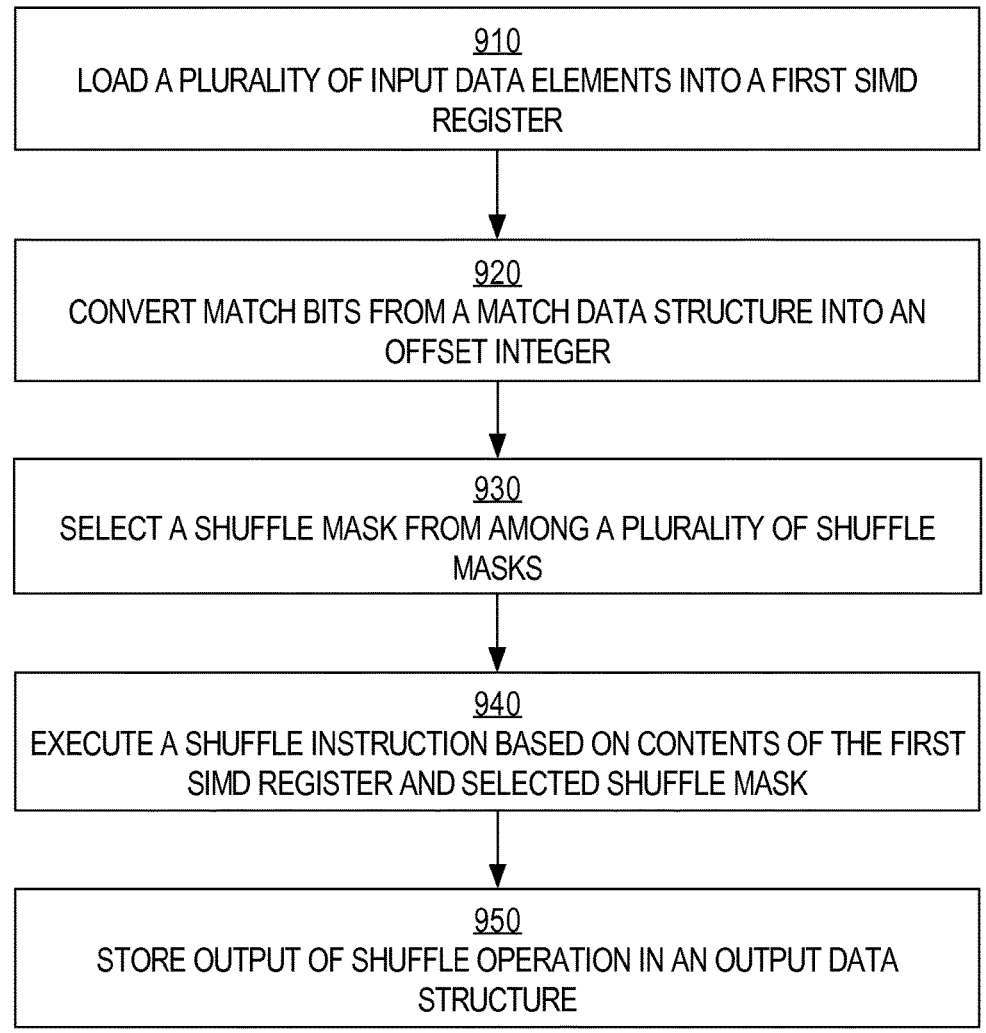
FIG. 9 is a flow diagram that depicts a process for performing data compaction, in an embodiment.

FIG. 9 is a flow diagram that depicts a process 900 for performing data compaction, in an embodiment. Process 900 may be used in one of multiple contexts, which may include or exclude hash table join and aggregation. Process 900 is described in conjunction with FIG. 10, which is a block diagram that depicts a flow of data and operations that are performed for data compaction, in an embodiment.

At block 910, a plurality (e.g., N) of data elements are loaded from an input array into a SIMD register ("SIMD input register"). Block 910 may be performed using a SIMD load instruction, such as "_mm_loadu_si128((_m128i*)(ridin))" where "ridin" refers to the input array. Although block 910 is depicted as occurring before blocks 920-930, block 910 may be performed after block 920 or after block 930.

Block 910 may also involve advancing the pointer for the input array so that, on the next iteration of process 900, the pointer points to the next set of data elements from the input array and that next set of data elements may be read into an input SIMD register.

Figure 10:
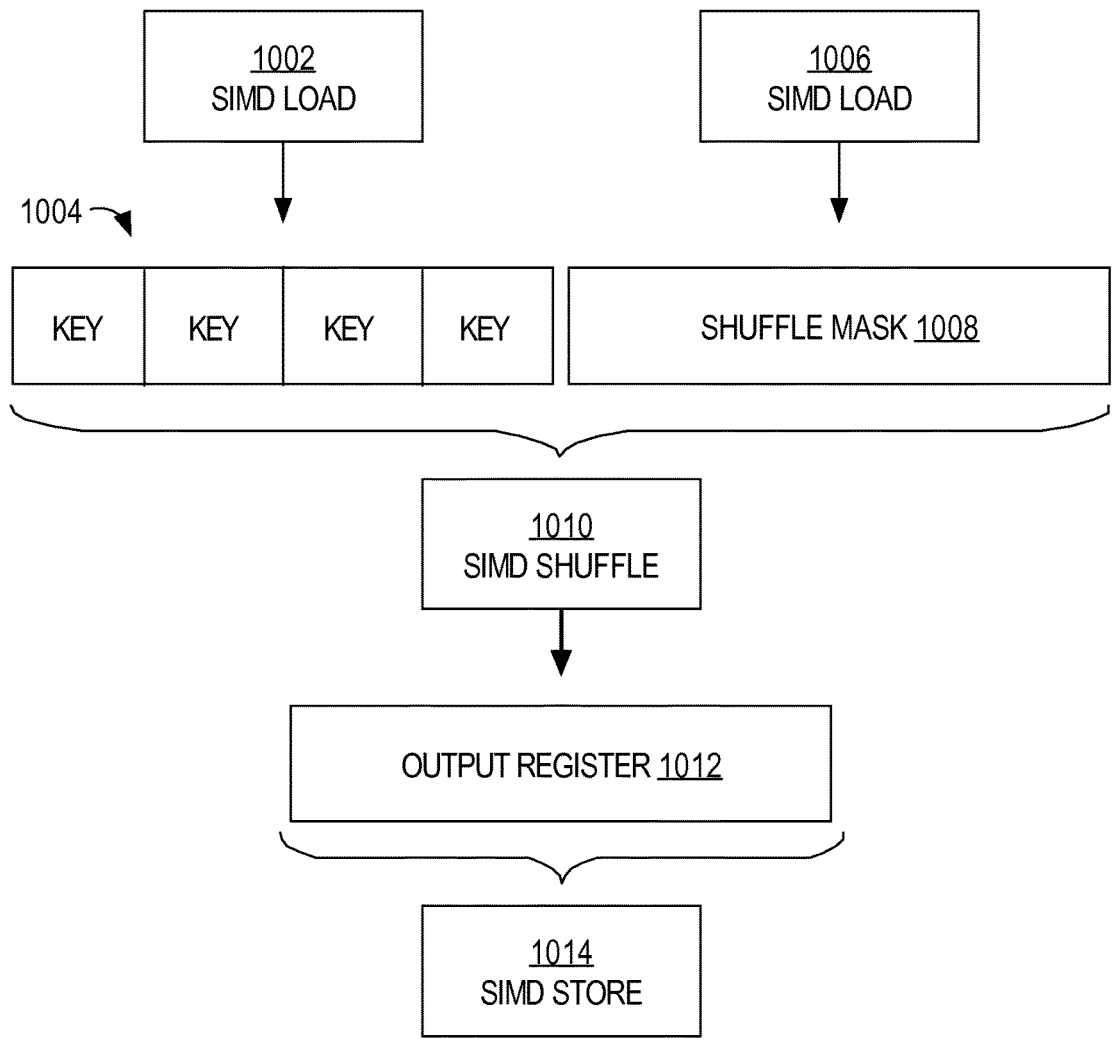
FIG. 10 is a block diagram that depicts a flow of data and operations that are performed for data compaction, in an embodiment.

In FIG. 10, operation 1002 is a SIMD load operation that, when performed, stores a set of data elements from the input array into a SIMD register 1004.

At block 920, match bits that are from a match data structure and that correspond to the N keys are converted into an offset integer. An example of a match data structure is an array of elements or a single string of bits. The match data structure may consist of 1s and 0s. For example, a 4-byte data element representing a match may comprise 16 bits of is while a 4-byte data element representing a non-match may comprise 16 bits of 0s. As another example, each match bit in match array may correspond to a different data element in the input array.

Block 920 may be performed using a SIMD instruction to convert the N match bits into an offset integer. An example of such a SIMD instruction is as follows: "_mm_movemask_ps(m1)." For example, if four match indicators in a SIMD register are "0100", this may be converted into an offset integer of '4' while match indicators "0011" may be converted into an offset integer of '3'.

Block 920 may also involve advancing a pointer for the match data structure so that, on the next iteration of process 900, the pointer points to the next set of elements or bits that correspond to the next set of data elements from the input array.

At block 930, a shuffle mask is selected from among a plurality of shuffle masks based on the offset integer. The shuffle mask is loaded into a SIMD register ("SIMD mask register"). Each shuffle mask represents a different combination of possible "wanted" elements. Thus, each shuffle mask corresponds to a different combination of 0s and is from the match array. Each shuffle mask, when used to perform a SIMD shuffle operation relative to a plurality of data elements (in the SIMD input register), ensures that wanted data elements are put into an output data structure and unwanted data elements are not. Assuming wanted elements are logically placed into the output data structure from left to right, if there are any wanted elements that are to the logical right of any unwanted elements, then the appropriate shuffle mask assures that the wanted elements are shifted one or more positions to the logical left before being written to the output data structure (or even before being output to an output SIMD register).

Block 930 may be performed by executing the following SIMD instruction: "_mm_load_si128((_m128i*)(maskarray[offset]));" where "offset" is the offset integer calculated in block 920 and "maskarray[ ]" is an array of multiple shuffle masks. If N=4, then there would be 16 ($2^4$) shuffle masks. If N=8, then there would be 256 ($2^8$) shuffle masks.

In FIG. 10, operation 1006 is a SIMD load operation that, when executed, causes a shuffle mask to be loaded into a SIMD register 1008.

At block 940, a SIMD shuffle instruction is used to initiate a shuffle operation, which takes the SIMD input register and the SIMD mask register as inputs. Output from performing the SIMD shuffle instruction is stored in a SIMD output register. Example code for performing block 940 is as follows: "ridsin=_mm_shuffle_epi8(ridsin, mask);" where "ridsin" refers to the SIMD input register, "mask" refers to the SIMD mask register, and "_mm_shuffle_epi8" is the name of the SIMD instruction.

In FIG. 10, operation 1010 is a SIMD shuffle operation that takes, as input, contents from SIMD register 1004 and contents from SIMD register 1008. Results of operation 1010 are stored in SIMD register 1012, which may be the same register as SIMD register 1004 or SIMD register 1008.

At block 950, the contents of the SIMD output register are stored into an output structure, an example of which is an array. An example SIMD store instruction to initiate such a storing is as follows: "_mm_storeu_si128((_m128i*)ridout, ridsin)" where "_mm_storeu_si128" is the name of the SIMD store instruction, "ridout" refers the output array, and "ridsin" refers to the SIMD output register.

In FIG. 10, operation 1014 is a SIMD store operation that takes the contents of SIMD register 1012 as input and stores the contents in an output data structure.

Block 950 may also involve counting the number of matches (e.g., based on the offset value calculated in block 920) and adjusting the current index of the output structure so that the next output written to the output structure is written to the proper location.

Blocks 910-950 are repeated X number of times, where X is the result of dividing the number of elements in input array by the number of elements that fit into a SIMD register. Thus, if there are 1000 elements in the input array and four elements can fit into a SIMD register at a time, then blocks 910-950 may be performed 250 times in order to process all the elements in the input array.

Hash Join with Duplicates

As noted previously, a process for performing a probe during a hash join operation may involve unique keys. However, if the join column in a hash join is not a key in the input relation, then multiple entries of a hash table bucket might match with an input key from the probe relation. The process of probing when the keys are unique versus when the keys are not unique may be quite different.

Pseudo-code for implementing a non-vectorized approach for performing a probe is as follows:

```
For each possible hash bucket
    For each slot of a hash bucket
    {
        If (bucketkey[i] == Key)
        {
            Keyout[out_index] = Key;
            RIDout[out_index] = bucketRIDs[i];
            out_index++;
        }
    }
```

Where "bucketkey[ ]" refers to a hash table that stores keys, "bucketRIDs[ ]" refers to a hash table that stores row IDs that correspond to the keys, "Keyout[ ]" refers to a data structure that stores keys from a probe relation that match a key in the build relation, "RIDOUT[ ]" refers to a data structure that stores row IDs of matching keys, and "out_index" refers to an index into the output data structures.

In an embodiment, a probe of a hash table that contains duplicate keys is performed using SIMD instructions. In an embodiment, the probe is performed using a feature of the data compaction technique described previously.

Figure 11A:
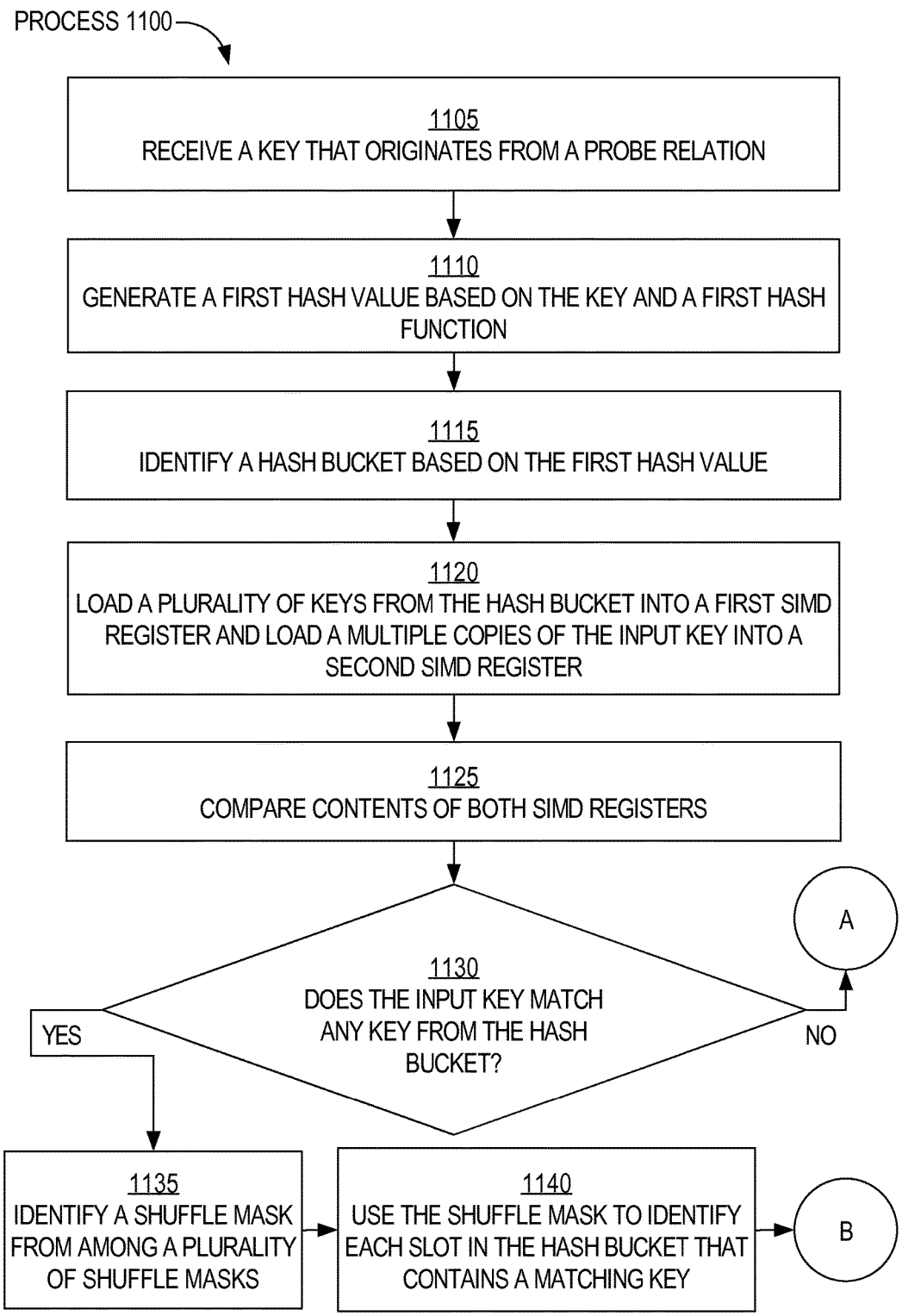
FIGS. 11A-11B is a flow diagram that depicts a process for probing a hash table that contains duplicate keys, in an embodiment.
Figure 11B:
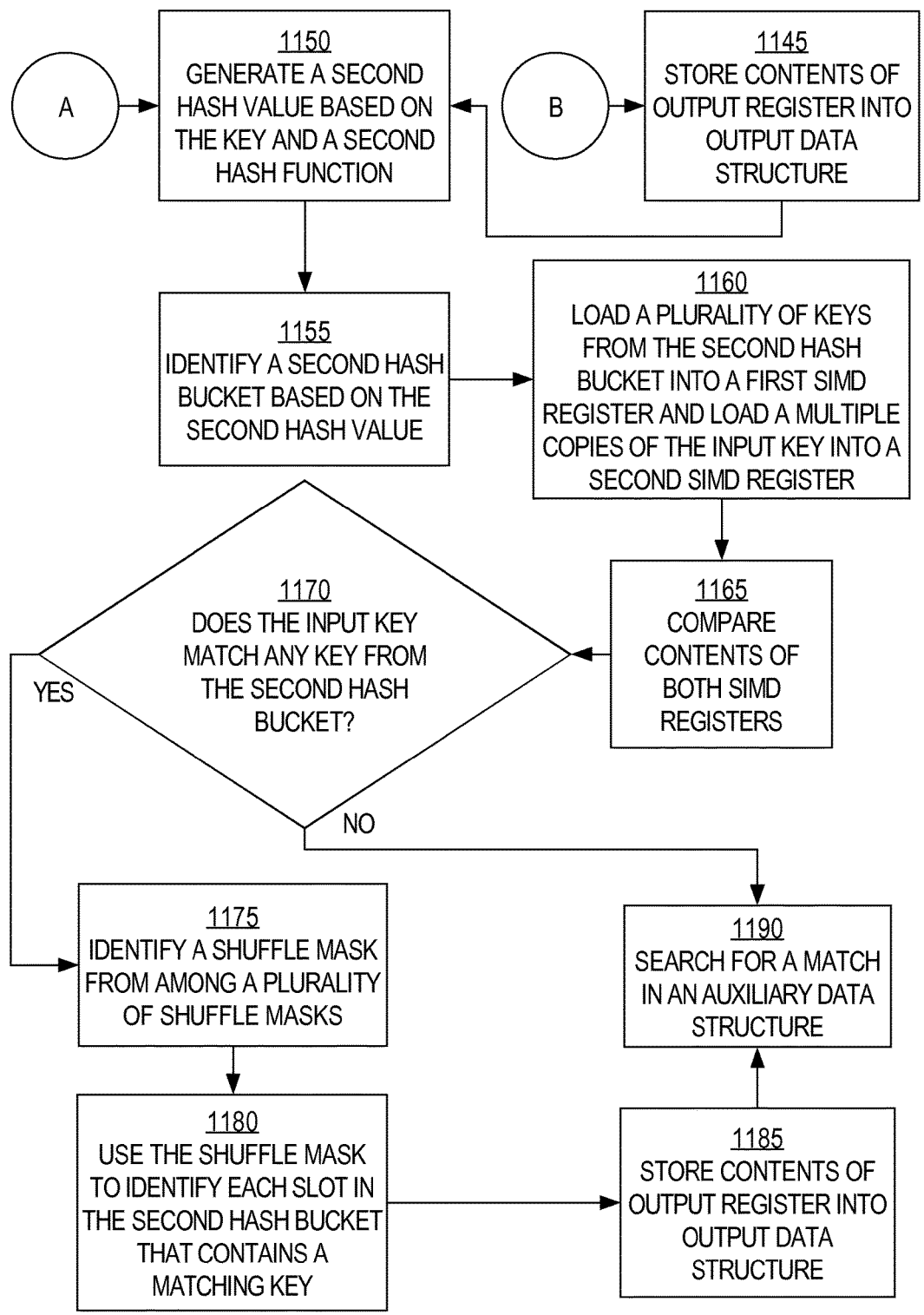

FIGS. 11A-11B is a flow diagram that depicts a process 1100 for probing a hash table that contains duplicate keys, in an embodiment. Process 1100 is similar to some portions of process 500. One difference is that a matching bit representation of 1s and 0s is generated for each identified hash bucket. Once the matching bit representation is generated for a hash bucket, then a feature of the data compaction technique is used to copy the matching keys and the corresponding data values into the appropriate output data structures.

At block 1105, a key is received. The key is from a probe relation (or table). The key may be received in response to a function call to probe a hash table based on the key.

At block 1110, a first hash value is generated based on the key and a first hash function.

At block 1115, a first hash bucket in the hash table is identified based on the first hash value. The first hash bucket may or may not have empty slots.

At block 1120, a first SIMD register is loaded with the keys from the first hash bucket and a second SIMD register is loaded with multiple copies of the input key.

At block 1125, the contents of the first SIMD register are compared with the contents of the second SIMD register. The result of the comparison is stored in an output SIMD register. The result indicates which keys from the first hash bucket (if any) match the input key. Because a build relation may include duplicate keys, the input key may match multiple keys in the first hash bucket.

At block 1130, it is determined whether the input key matches any keys in the first SIMD register (from the first hash bucket). If so, then process 1100 proceeds to block 1135; otherwise, process 1100 proceeds to block 1150. Block 1130 may be performed by processing the following SIMD instruction: "_mm_test_all_zeros(m1,m1)", which returns a value (e.g., zero or one) indicating whether the output SIMD register contains all zeros, which indicates whether the input key matches at least one of the keys in the first hash bucket.

At block 1135, the contents of the output SIMD register are used to identify a shuffle mask from among a plurality of shuffle masks. Block 1135 may be performed using a SIMD instruction to convert the N match bits into an offset integer. An example of such a SIMD instruction is: "_mm_movemask_ps(m1)." For example, if four match indicators in a SIMD register are "0110", this may be converted into an offset integer of '6' while match indicators "1011" may be converted into an offset integer of '11'.

Each shuffle mask represents a different combination of possible "wanted" elements. Thus, each shuffle mask corresponds to a different combination of 0s and is that may exist in the output SIMD register of block 1125. Each shuffle mask, when used to perform a SIMD shuffle operation relative to a plurality of data elements (in the first SIMD register of block 1120), ensures that wanted data elements are put into an output array and unwanted data elements are not.

Block 1135 may also involve loading the shuffle mask into a SIMD register ("SIMD mask register"). Such loading may be performed by processing the following SIMD instruction: "_mm_load_si128((_m128i*)(maskarray[offset]));" where "offset" is the offset integer calculated in block 1135 and "maskarray[ ]" is an array of multiple shuffle masks.

At block 1140, a SIMD shuffle instruction is used to initiate a shuffle operation, which takes the first SIMD register and the SIMD mask register as inputs. Output from performing the SIMD shuffle instruction is stored in a SIMD output register. Example code for performing block 1145 is as follows: "ridsin=_mm_shuffle_epi8(ridsin, mask);" where "ridsin" refers to the first SIMD register, "mask" refers to the SIMD mask register, and "_mm_shuffle_epi8" is the name of the SIMD instruction.

At block 1145, the contents of the SIMD output register are stored into the output array. An example SIMD store instruction to initiate such a storing is as follows: "_mm_storeu_si128((_m128i*)ridout, ridsin)" where "_mm_storeu_si128" is the name of the SIMD store instruction, "ridout" refers the output array, and "ridsin" refers to the SIMD output register.

Blocks 1150-1185 are similar to blocks 1110-1145, except that a second hash function is used to generate a second hash value based on the input key and the second hash value is used to identify a second hash bucket in the hash table. Regardless of whether the input key matches any key in the first hash bucket (as determined in block 1130), blocks 1150-1170 are still performed, since there may be numerous duplicates of the input key in the hash table.

At block 1190, after both hash functions are used, an auxiliary data structure (if one exists) is searched to determine whether the auxiliary data structure contains one or more keys that matches the input key.

As with the other described embodiments, process 1100 may be modified to include more than two hash functions, indicating that a key may hash to three or more hash buckets in a hash table. Alternatively, process 1100 may be modified to include only one hash function for the hash table. Thus, if a hash bucket is full, then one or more other data structures may be used to store a key that hashes to the hash bucket and, thus, those other data structures would be searched in process 1100.

Estimating a Cost of Executing a Database Operation Using Vectorized Instructions In an embodiment, a determination is made regarding which execution paths, from among a plurality of execution paths, to pursue when performing a database operation. The plurality of execution paths include at least a vectorized approach and a non-vectorized approach. A vectorized approach involves performing a database operation using one or more SIMD instructions and a non-vectorized approach involves performing a database operation without using any SIMD instructions.

A vectorized approach does not necessarily mean that only SIMD instructions are used to perform a database operation. Thus, a vectorized approach may include scalar instructions (or non-SIMD instruction). Examples of database operations include hash join build, hash join probe (with or without duplicates), and aggregation.

The determination of whether to use a vectorized approach or a non-vectorized approach may be based on one or more factors. Some factors may include heuristics. For example, one factor may be the number of data elements that may fit into a SIMD register. For example, if the number of data elements that may fit into a SIMD register is a power of two (e.g., 2, 4, 8, 16, etc.), then either a vectorized approach is automatically selected or both the vectorized and non-vectorized approaches are candidates. Otherwise, a non-vectorized approach is selected. As another example, if the number of data elements that may fit into a SIMD register is two or less (e.g., a 128 bit register where the data elements are 64 bits each), then a non-vectorized approach is automatically selected.

Another factor may be the size of a relation or table to determine whether to use a vectorized approach or a non-vectorized approach. For example, if the projected size of a hash table is larger than a particular size, then a non-vectorized approach is automatically selected. The particular size may be the size (or based on the size) of a cache in the computer system that implements either approach. For example, if the size of the projected hash table size (or a proxy thereof, such as number of rows or number of distinct values in a relation (i.e., "NDV(relation)")) is less than or equal to twice the size of L3 cache, then the vectorized and non-vectorized approaches are candidates; otherwise a non-vectorized approach is selected.

In an embodiment, the particular size (against which the projected size of the hash table is compared) is based on a size of a cache and an adjustment factor that may be hard-coded or modifiable by an administrator. If the adjustment factor is two, then that indicates that at most half of the hash table in non-cache memory is acceptable.

The projected hash table size may be different depending on whether the operation involved is a join operation or an aggregation operation. For a join operation, the projected hash table size may be calculated by multiplying the number of rows of the input relation (i.e., "Nrows(relation)") by the size of the key (e.g., 4 bytes) and by the size of the row identifier (which may be the same or different than the size of the key). Thus, the projected hash table join may be expressed as follows: "Hash-Table-Size-Join(relation)=Nrows(relation)*sizeof(key)*sizeof(RID)."

For an aggregation operation, the projected hash table size may be calculated by multiplying the number of distinct values in the target relation by the size of the key and the size of the aggregates. The size of the aggregates ("SizeofAggregates") is equal to the sum of all the aggregates in a query ("$\Sigma_1^x$ size of "i"th aggregate"), where "x" refers to the number of aggregates in the query. Thus, the projected hash table join may be expressed as follows: "Hash-Table-Size-Agg(relation)=NDV(relation)*sizeof(key)*SizeofAggregates."

Additionally or alternatively to heuristics, factors based on estimated usage of one or more computer resources may be used to determine whether to use a vectorized approach or a non-vectorized approach to executing an operation. Computer resources include CPU, memory (e.g., volatile and/or non-volatile), disk I/O, and network I/O.

Example CPU factors include the number of data elements in the input to a database operation, the size of a vector, the number of SIMD instructions per vector, the number of non-SIMD instructions per vector, the number of data movements per vector between SIMD instructions and non-SIMD instructions, the cost of each (whether SIMD or non-SIMD) instruction, the cost of a data movement, the total cost of all SIMD instructions, the total cost of all non-SIMD instructions, the total cost of all data movements, and/or the total cost of each vector.

An example formula for determining a cost of performing an operation using vectorized instructions is as follows:

Vector-size=SIMD-Register-Width/Key-width;
Nrows(relation)=Number of rows in the "relation"
N=Number of SIMD Instructions per key
M=Number of non-SIMD Instructions per key
X=Number of data movements per key between SIMD and non-SIMD instructions per key.
Cost of any instruction=Latency of instruction as provided in a processor manual.
Cost of data movement=Data movement latency to and from SIMD Unit as provided in processor manual.
Cost-SIMD-Instructions=$\Sigma_1^N$ Cost of SIMD instruction "i"
Cost-non-SIMD-Instructions=$\Sigma_1^M$ Cost of non-SIMD instruction "i"
Cost-data-movement=$\Sigma_1^X$ Cost of "i"th data movement
Cost-of-Key=Cost-SIMD-Instructions+Cost-non-SIMD-Instructions+Cost-data-movement
Cost-of-Vectorized-Operation(relation)=Cost-of-Key*Nrows(relation)
If "R" relations are involved in a database operator, then the cost for all relations is added to get the total cost.
Total-Cost-of-Vectorized-Operation(operator)=$\Sigma_1^R$ Cost Of Vectorized Operation(i)
Total-Cost-of-Nonvectorized-Operation(operator)=Already available in current system.

In many of the examples described herein, "Vector-size" is 128 bits/32 bits=4. In other words, four data elements are being operated on during each SIMD instruction.

"SIMD-Register-Width" refers to the number of bits or bytes that may fit into a SIMD register. This value may be provided in a processor manual.

"Key-width" refers to the size (in bits or bytes) of a key.

"Nrows(relation)" refers to the number of rows in a relation, such as a build relation or a probe relation.

"N" may be calculated by counting (whether manually or automatically) the number of SIMD instructions in a vectorized approach for performing an operation with respect to a single input key. Similarly, "M" may be calculating counting the number of non-SIMD instructions in the vectorized approach for performing an operation with respect to a single input key. For example, in the example code for performing a minimum aggregation operation, there are 13 IMD instructions and three non-SIMD instructions.

"X" may be calculated by totaling a number of times, when performing an operation with respect to a single input key, that input to a SIMD instruction comes from a non-SIMD instruction and/or vice versa. In the example code for performing a minimum aggregation operation, there are three instructions that involve input from a SIMD instruction to a non-SIMD instruction and vice versa.

The "Cost of any instruction" refers to the latency of an instruction and may be determined based on information provided in a manual for a processor, whether a SIMD processor or a traditional (i.e., non-SIMD) processor. For example, the cost of executing a SIMD MIN POS instruction may be two CPU cycles while the cost of executing an assign instruction that assigns a value located in memory to a variable may be four CPU cycles.

The "Cost of data movement" refers to the latency of moving data to and from a SIMD unit (e.g., coprocessor) for a particular instruction. The cost of may be determined based on information provided in a processor manual and, thus, may be hard-coded.

The "Cost-SIMD-Instructions" refers to the total cost of executing all (or multiple) of the SIMD instructions that are involved in an operation with respect to a single input key.

Similarly, the "Cost-non-SIMD-Instructions" refers to the cost of executing all (or multiple) of the non-SIMD instructions that are involved in the operation with respect a single input key. Similarly, the "Cost-data-movement" refers to the cost of executing all (or multiple) of the data movement instructions that are involved in the operation with respect to a single input key.

The "Cost-of-Key" refers to the sum of the previously-enumerated costs (i.e., Cost-SIMD-Instructions, Cost-non-SIMD-Instructions, and Cost-data-movement) and represents an estimated cost of processing each key.

The "Cost-of-Vectorized-Operation(relation)" refers to the cost of performing an operation with respect to a particular relation using a vectorized approach and is the result of multiplying the "Cost-of-Key" by "Nrows(relation)" (or the number of rows in the relation).

The value of "Cost-of-Vectorized-Operation" is compared with an estimated cost of performing the operation using a non-vectorized approach, which estimated cost may be calculated using one of multiple techniques.

In an embodiment, calculating an estimated cost of performing a database operation using a vectorized approach is only performed if one or more of the previously described factors are considered. For example, the estimated cost is calculated only if it is determined that the number of data elements that can fit into a SIMD register (e.g., "vector size") is a power of two. As another example, the estimated cost is calculated only if it is determined that the projected size of a hash table is less than a particular threshold and, optionally, if the vector size is a power of two.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 12:
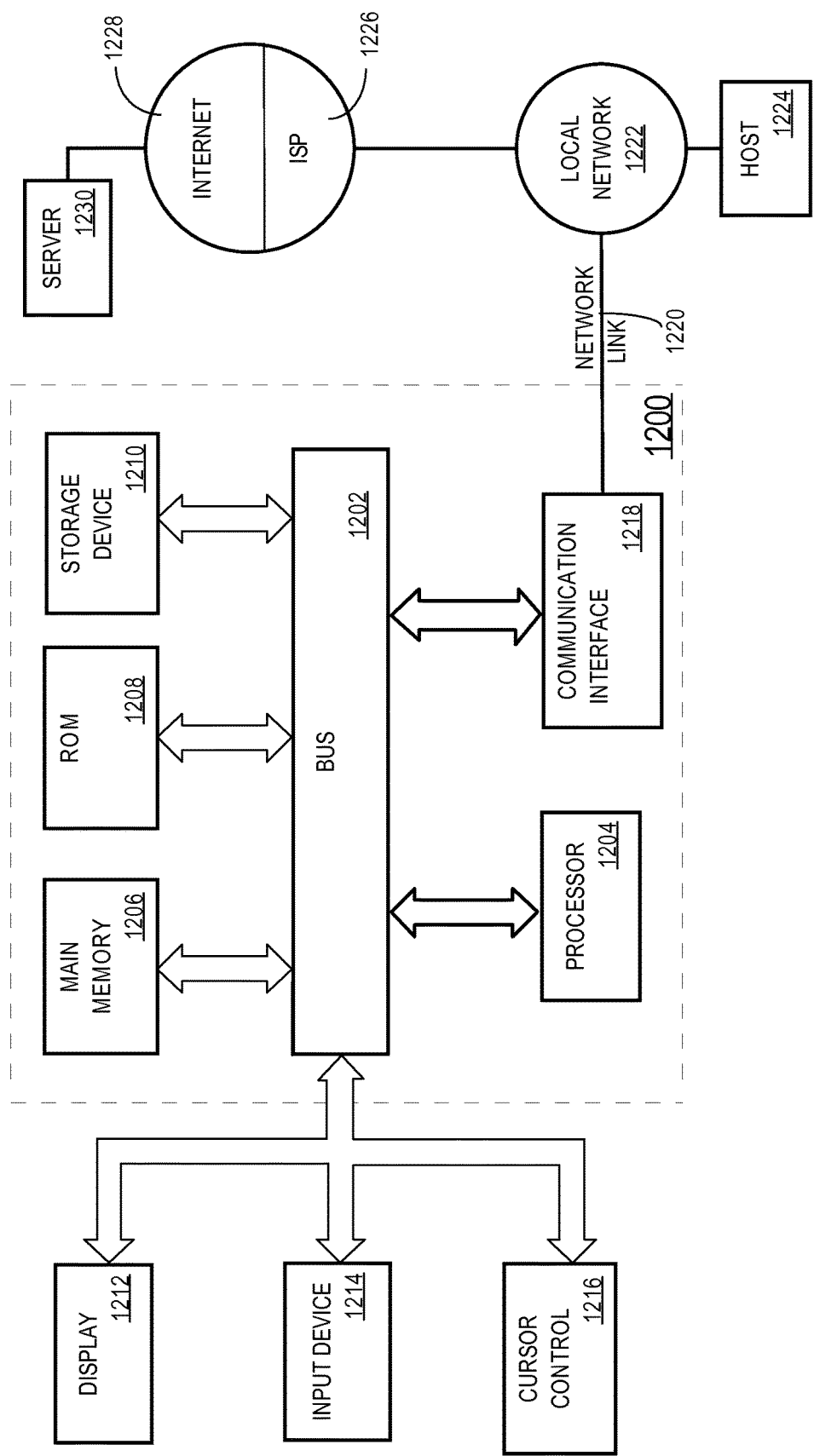
FIG. 12 is a block diagram that illustrates a computer system upon which an embodiment of the invention may be implemented.

For example, FIG. 12 is a block diagram that illustrates a computer system 1200 upon which an embodiment of the invention may be implemented. Computer system 1200 includes a bus 1202 or other communication mechanism for communicating information, and a hardware processor 1204 coupled with bus 1202 for processing information. Hardware processor 1204 may be, for example, a general purpose microprocessor.

Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Such instructions, when stored in non-transitory storage media accessible to processor 1204, render computer system 1200 into a special-purpose machine that is customized to perform the operations specified in the instructions.

Computer system 1200 further includes a read only memory (ROM) 1208 or other static storage device coupled to bus 1202 for storing static information and instructions for processor 1204. A storage device 1210, such as a magnetic disk or optical disk, is provided and coupled to bus 1202 for storing information and instructions.

Computer system 1200 may be coupled via bus 1202 to a display 1212, such as a cathode ray tube (CRT), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

Computer system 1200 may implement the techniques described herein using customized hard-wired logic, one or more ASICs or FPGAs, firmware and/or program logic which in combination with the computer system causes or programs computer system 1200 to be a special-purpose machine. According to one embodiment, the techniques herein are performed by computer system 1200 in response to processor 1204 executing one or more sequences of one or more instructions contained in main memory 1206. Such instructions may be read into main memory 1206 from another storage medium, such as storage device 1210. Execution of the sequences of instructions contained in main memory 1206 causes processor 1204 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1210. Volatile media includes dynamic memory, such as main memory 1206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1202. Transmission media can also take the form of acoustic or light waves, such as those generated during radio-wave and infra-red data communications.

Various forms of media may be involved in carrying one or more sequences of one or more instructions to processor 1204 for execution. For example, the instructions may initially be carried on a magnetic disk or solid state drive of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card, cable modem, satellite modem, or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are example forms of transmission media.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218.

The received code may be executed by processor 1204 as it is received, and/or stored in storage device 1210, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
  while executing a join operation, probing a hash table based on keys from a second relation that is different than a first relation upon which the hash table is based;
  wherein probing the hash table comprises:
    identifying a first key from the second relation;
    generating a hash value based on the first key;
    identifying, based on the hash value, in the hash table, a bucket that contains a plurality of keys;
    loading the plurality of keys into a first register;
    determining whether the first key matches a key in the plurality of keys;
    in response to determining that the first key matches a particular key in the plurality of keys, using one or more vectorized instructions to determine a position, within the bucket, where the particular key is located;
  wherein the one or more vectorized instructions includes:
    (a) a minimum position instruction that, when executed against a second register that contains a plurality of values, generates output that indicates a position, within the second register, that contains a minimum value of the plurality of values, or
    (b) a maximum position instruction that, when executed against the second register that contains the plurality of values, generates output that indicates a position, within the second register, that contains a maximum value of the plurality of values;
  wherein the method is performed by one or more computing devices.

2. The method of claim 1, wherein probing the hash table further comprises identifying, based on the position, within the bucket, a data value that corresponds to the particular key.

3. The method of claim 1, wherein:
  using the one or more vectorized instructions comprises using a vectorized instruction to extract a position value from a third register;
  the position within the bucket is based on the position value.

4. The method of claim 1, wherein:
  the one or more vectorized instructions includes the minimum position instruction that, when executed against the second register that contains the plurality of values, generates output that indicates the position, within the second register, that contains the minimum value of the plurality of values.

5. A method comprising:
  while executing a join operation, probing a hash table based on keys from a second relation that is different than a first relation upon which the hash table is based;
  wherein probing the hash table comprises:
    identifying a first key from the second relation;
    generating a hash value based on the first key;
    identifying, based on the hash value, in the hash table, a bucket that contains a plurality of keys;
    loading the plurality of keys into a first register;
    determining whether the first key matches a key in the plurality of keys;
    in response to determining that the first key matches a particular key in the plurality of keys, using one or more vectorized instructions to determine a position, within the bucket, where the particular key is located;
  wherein the one or more vectorized instructions includes an instruction that, when executed against a second register that contains a plurality of values and a third register that contains all one bits or zero bits, generates output that contains, for each value of the plurality of values, a value that is opposite of said each value.

6. The method of claim 5, wherein the one or more vectorized instructions includes a compare instruction that, when executed against a fourth register that contains multiple copies of the first key, generates output that is stored in the third register.

7. The method of claim 1, wherein probing the hash table further comprises:
identifying a second key from the second relation;
generating a second hash value based on the second key;
identifying, based on the second hash value in the hash table, a second bucket that contains a second plurality of keys;
loading the second plurality of keys into a third register that is capable of storing multiple data elements;
determining whether the second key matches a key in the second plurality of keys;
in response to determining that the second key does not match any key in the second plurality of keys:
generating a third hash value based on the second key;
identifying, based on the third hash value in the hash table, a third bucket that contains a third plurality of keys that are different than the second plurality of keys;
loading the third plurality of keys into a fourth register;
determining whether the second key matches a key in the third plurality of keys.

8. The method of claim 7, wherein probing the hash table further comprises:
in response to determining that the second key does not match any key in the third plurality of keys, determining whether the second key is found in a second data structure that is different than the hash table.

9. The method of claim 1, wherein determining whether the first key matches a key in the plurality of keys is performed using one or more second vectorized instructions.

10. The method of claim 9, wherein:
the one or more second vectorized instructions includes a compare instruction;
determining whether the first key matches a key in the plurality of keys comprises:
causing a third register that is different than the first register to contain multiple copies of the first key;
using the compare instruction to compare contents of the first register with contents of the third register.

11. One or more non-transitory storage media storing instructions which, when executed by one or more processors, cause:
while executing a join operation, probing a hash table based on keys from a second relation that is different than a first relation upon which the hash table is based;
wherein probing the hash table comprises:
identifying a first key from the second relation;
generating a hash value based on the first key;
identifying, based on the hash value, in the hash table, a bucket that contains a plurality of keys;
loading the plurality of keys into a first register;
determining whether the first key matches a key in the plurality of keys;
in response to determining that the first key matches a particular key in the plurality of keys, using one or more vectorized instructions to determine a position, within the bucket, where the particular key is located;
wherein the one or more vectorized instructions includes:
(a) a minimum position instruction that, when executed against a second register that contains a plurality of values, generates output that indicates a position, within the second register, that contains a minimum value of the plurality of values, or
(b) a maximum position instruction that, when executed against the second register that contains the plurality of values, generates output that indicates a position, within the second register, that contains a maximum value of the plurality of values.

12. The one or more storage media of claim 11, wherein probing the hash table further comprises identifying, based on the position, within the bucket, a data value that corresponds to the particular key.

13. The one or more storage media of claim 11, wherein:
using the one or more vectorized instructions comprises using a vectorized instruction to extract a position value from a third register;
the position within the bucket is based on the position value.

14. The one or more storage media of claim 11, wherein:
the one or more vectorized instructions includes the minimum position instruction that, when executed against the second register that contains the plurality of values, generates output that indicates the position, within the second register, that contains the minimum value of the plurality of values.

15. One or more non-transitory storage media storing instructions which, when executed by one or more processors, cause:
while executing a join operation, probing a hash table based on keys from a second relation that is different than a first relation upon which the hash table is based;
wherein probing the hash table comprises:
identifying a first key from the second relation;
generating a hash value based on the first key;
identifying, based on the hash value, in the hash table, a bucket that contains a plurality of keys;
loading the plurality of keys into a first register;
determining whether the first key matches a key in the plurality of keys;
in response to determining that the first key matches a particular key in the plurality of keys, using one or more vectorized instructions to determine a position, within the bucket, where the particular key is located;
wherein the one or more vectorized instructions includes an instruction that, when executed against a second register that contains a plurality of values and a third register that contains all one bits or zero bits, generates output that contains, for each value of the plurality of values, a value that is opposite of said each value.

16. The one or more storage media of claim 15, wherein the one or more vectorized instructions includes a compare instruction that, when executed against a fourth register that contains multiple copies of the first key, generates output that is stored in the third register.

17. The one or more storage media of claim 11, wherein probing the hash table further comprises:
identifying a second key from the second relation;
generating a second hash value based on the second key;
identifying, based on the second hash value in the hash table, a second bucket that contains a second plurality of keys;
loading the second plurality of keys into a third register that is capable of storing multiple data elements;
determining whether the second key matches a key in the second plurality of keys;
in response to determining that the second key does not match any key in the second plurality of keys:

generating a third hash value based on the second key;
identifying, based on the third hash value in the hash table, a third bucket that contains a third plurality of keys that are different than the second plurality of keys;
loading the third plurality of keys into a fourth register;
determining whether the second key matches a key in the third plurality of keys.

18. The one or more storage media of claim 17, wherein probing the hash table further comprises:
in response to determining that the second key does not match any key in the third plurality of keys, determining whether the second key is found in a second data structure that is different than the hash table.

19. The one or more storage media of claim 11, wherein determining whether the first key matches a key in the plurality of keys is performed using one or more second vectorized instructions.

20. The one or more storage media of claim 19, wherein:
the one or more second vectorized instructions includes a compare instruction;
determining whether the first key matches a key in the plurality of keys comprises:
causing a third register that is different than the first register to contain multiple copies of the first key;
using the compare instruction to compare contents of the first register with contents of the third register.

* * * * *

UNITED STATES PATENT AND TRADEMARK OFFICE
CERTIFICATE OF CORRECTION

PATENT NO. : 9,659,046 B2  
APPLICATION NO. : 13/956350  
DATED : May 23, 2017  
INVENTOR(S) : Sen et al.

Page 1 of 1

It is certified that error appears in the above-identified patent and that said Letters Patent is hereby corrected as shown below:

On the Title Page

Column 1, under Assignee, Line 1, delete "Inernational" and insert -- International --, therefor.

On page 2, Column 1, under Other Publications, Line 12, delete "Vectotization" and insert -- Vectorization --, therefor.

In the Specification

In Column 11, Line 19, delete "8-bt" and insert -- 8-bit --, therefor.

In Column 11, Line 46, delete "8-bt" and insert -- 8-bit --, therefor.

In Column 13, Line 55, after "All" insert -- 1s --.

In Column 17, Line 17, delete "ml);" and insert -- m1); --, therefor.

In Column 17, Line 49, delete "[_mm_mm_" and insert -- [_mm_ --, therefor.

In Column 21, Line 32, delete "is" and insert -- 1s --, therefor.

In Column 21, Line 53, delete "is" and insert -- 1s --, therefor.

In Column 23, Line 61, delete "is" and insert -- 1s --, therefor.

Signed and Sealed this  
Twenty-third Day of January, 2018

Joseph Matal  
*Performing the Functions and Duties of the*  
*Under Secretary of Commerce for Intellectual Property and*  
*Director of the United States Patent and Trademark Office*